US009538629B2

(12) United States Patent
Saito et al.

(10) Patent No.: US 9,538,629 B2
(45) Date of Patent: Jan. 3, 2017

(54) CHAMBER FOR EXTREME ULTRAVIOLET LIGHT GENERATION APPARATUS, AND EXTREME ULTRAVIOLET LIGHT GENERATION APPARATUS

(71) Applicant: GIGAPHOTON INC., Oyama-shi, Tochigi-ken (JP)

(72) Inventors: Takashi Saito, Oyama (JP); Naoyoshi Imachi, Oyama (JP); Osamu Wakabayashi, Oyama (JP)

(73) Assignee: GIGAPHOTON INC., Tochigi (JP)

( * ) Notice: Subject to any disclaimer, the term of this patent is extended or adjusted under 35 U.S.C. 154(b) by 364 days.

(21) Appl. No.: 14/201,327

(22) Filed: Mar. 7, 2014

(65) Prior Publication Data

US 2014/0253716 A1 Sep. 11, 2014

(30) Foreign Application Priority Data

Mar. 8, 2013 (JP) ................................ 2013-046932

(51) Int. Cl.
*H04N 9/64* (2006.01)
*G02B 27/64* (2006.01)
*H05G 2/00* (2006.01)

(52) U.S. Cl.
CPC .............. *H05G 2/006* (2013.01); *H05G 2/005* (2013.01); *H05G 2/008* (2013.01)

(58) Field of Classification Search
None
See application file for complete search history.

(56) References Cited

U.S. PATENT DOCUMENTS

2003/0223542 A1* 12/2003 Shields .................. H05G 2/008 378/119
2005/0205810 A1* 9/2005 Akins .................... B82Y 10/00 250/504 R
2006/0192153 A1 8/2006 Bykanov et al.
2006/0192154 A1 8/2006 Algots et al.
2006/0192155 A1 8/2006 Algots et al.
2006/0255298 A1 11/2006 Bykanov et al.
2008/0283776 A1 11/2008 Algots et al.
2010/0294958 A1* 11/2010 Hayashi ................. H05G 2/006 250/504 R
2010/0327192 A1* 12/2010 Fomenkov .......... G03F 7/70033 250/504 R
2011/0204249 A1* 8/2011 Nagai ....................... G01J 3/10 250/372
2011/0284774 A1* 11/2011 Ishihara ................. H05G 2/003 250/504 R
2012/0228525 A1* 9/2012 Moriya .................. H05G 2/003 250/504 R
2012/0286176 A1* 11/2012 Rajyaguru ............. H05G 2/005 250/504 R (Continued)

FOREIGN PATENT DOCUMENTS

JP 2008-532228 A 8/2008

*Primary Examiner* — Jeremiah C Hallenbeck-Huber
*Assistant Examiner* — Samuel D Fereja
(74) *Attorney, Agent, or Firm* — Studebaker & Brackett PC

(57) ABSTRACT

A chamber for an extreme ultraviolet light generation apparatus is a chamber into which droplets are sequentially outputted, and may include an image capturing unit configured to repeatedly capture images of the droplets during an image capturing time set so that images of two adjacent droplets that have been outputted do not overlap.

2 Claims, 18 Drawing Sheets

(56) References Cited

U.S. PATENT DOCUMENTS

2012/0292527 A1* 11/2012 Fomenkov .............. B22F 3/105
250/432 R
2012/0305809 A1* 12/2012 Moriya .................. H05G 2/008
250/504 R
2012/0305811 A1* 12/2012 Wakabayashi ......... H05G 2/008
250/504 R
2013/0026393 A1* 1/2013 Abe ....................... H05G 2/005
250/504 R
2013/0234051 A1* 9/2013 Rajyaguru .......... G03F 7/70033
250/504 R

* cited by examiner

DROPLET DIAMETER CALCULATION (S209)

A

DROPLET SHADOW IMAGE

B

A

B

CHAMBER FOR EXTREME ULTRAVIOLET LIGHT GENERATION APPARATUS, AND EXTREME ULTRAVIOLET LIGHT GENERATION APPARATUS

CROSS-REFERENCE TO A RELATED APPLICATION

The present application claims priority from Japanese Patent Application No. 2013-046932 filed on Mar. 8, 2013.

BACKGROUND

1. Technical Field

The present disclosure relates to chambers for extreme ultraviolet (EUV) light generation apparatuses, and to extreme ultraviolet light generation apparatuses.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

A chamber for an extreme ultraviolet light generation apparatus according to one aspect of the present disclosure is a chamber into which droplets are sequentially outputted, and may include an image capturing unit. The image capturing unit may be configured to repeatedly capture images of the droplets during an image capturing time set so that images of two adjacent droplets that have been outputted do not overlap.

BRIEF DESCRIPTION OF THE DRAWINGS

Hereinafter, selected embodiments of the present disclosure will be described with reference to the accompanying drawings.

DETAILED DESCRIPTION

Figure 1:
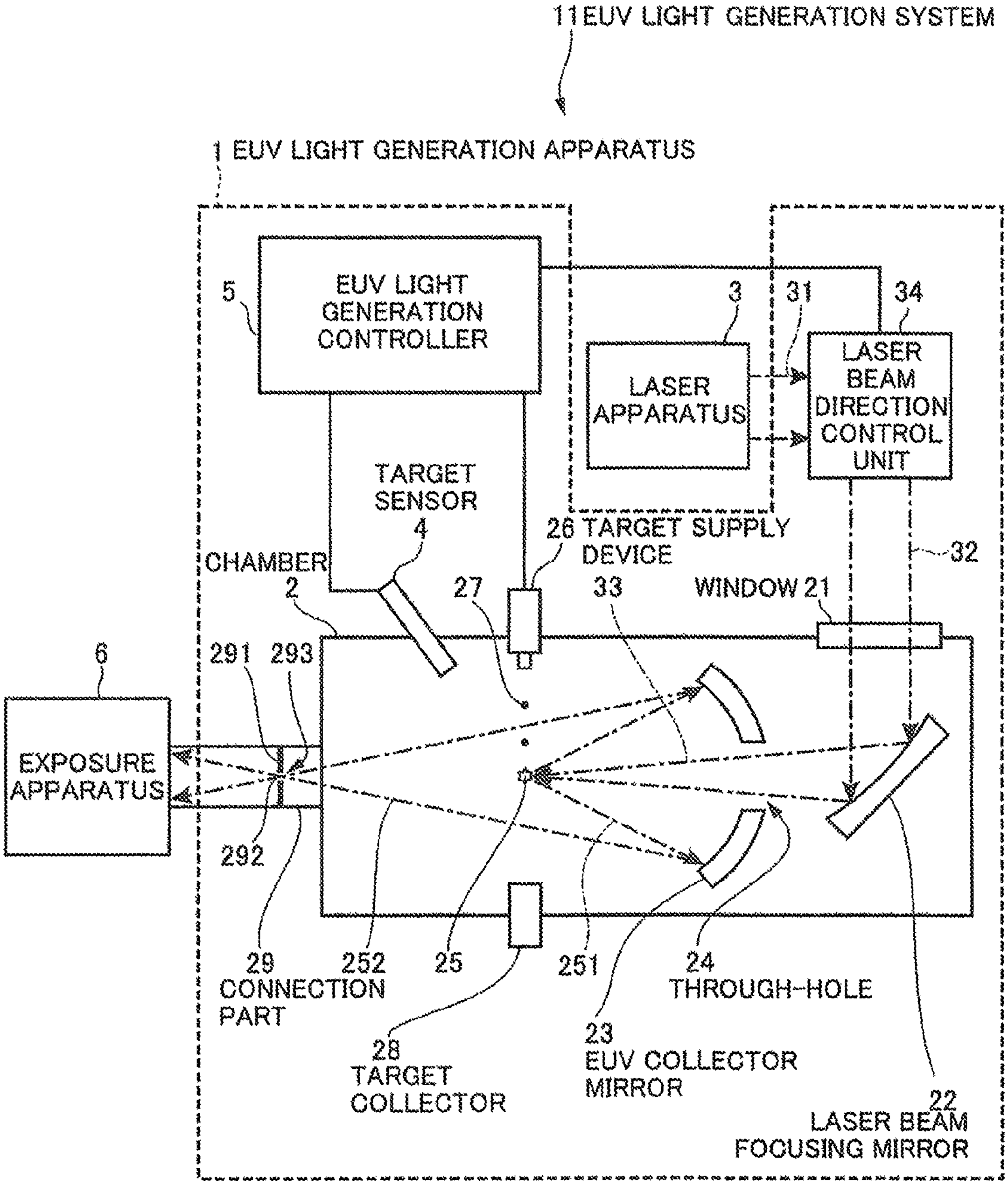
FIG. 1 schematically illustrates an exemplary configuration of an LPP type EUV light generation system.

Hereinafter, selected embodiments of the present disclosure will be described in detail with reference to the accompanying drawings. The embodiments to be described below are merely illustrative in nature and do not limit the scope of the present disclosure. Further, the configurations and operations described in each embodiment are not all essential in implementing the present disclosure. Note that like elements are referenced by like reference numerals and characters, and duplicate descriptions thereof will be omitted herein.

Contents

1. Overview
2. Terms
3. Overview of EUV Light Generation System
3.1 Configuration
3.2 Operation
4. EUV Light Generation Apparatus Including Target Generation Apparatus
4.1 Configuration
4.2 Operation
4.3 Issue 5. Remaining Target Amount Measurement System Provided in EUV Light Generation Apparatus According to First Embodiment
5.1 Configuration
5.2 Operation
5.3 Effect
5.4 Variation on First Embodiment
6. Remaining Target Amount Measurement System Provided in EUV Light Generation Apparatus According to Second Embodiment
6.1 Configuration
6.2 Operation
6.3 Effect
6.4 Variation on Second Embodiment
7. Remaining Target Amount Measurement System Provided in EUV Light Generation Apparatus According to Third Embodiment
7.1 Configuration
7.2 Operation
7.3 Effect
8. Other
8.1 Hardware Environment for Control Units
8.2 Electric Circuitry of Photodetector
8.3 Other Variations

1. Overview

The present disclosure can disclose at least the following embodiment.

A chamber 2 for an EUV light generation apparatus 1 according to the present disclosure is a chamber 2 into which droplets 271 are sequentially outputted, and may include an image capturing unit 412 configured to repeatedly capture images of the droplets 271 during an image capturing time Δt set so that images of two adjacent droplets 271 that have been outputted do not overlap.

Accordingly, with the chamber 2 in the EUV light generation apparatus 1 according to the present disclosure, the images of the droplets 271 do not overlap, and thus the diameter D of the droplets 271 actually outputted into the chamber 2 can be measured individually.

2. Terms

A "target" is a material that is introduced into a chamber and irradiated with a laser beam. The target that has been irradiated with the laser beam is turned into plasma and radiates EUV light.

"Droplet" refers to a form of the target supplied to the interior of the chamber.

3. Overview oF EUV Light Generation System

3.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26. The chamber 2 may be sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may, for example, be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specifications of an external apparatus, such as an exposure apparatus 6. The EUV collector mirror 23 may have a through-hole 24 formed at the center thereof so that a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture 293 may be provided in the connection part 29. The wall 291 may be positioned such that the second focus of the EUV collector mirror 23 lies in the aperture 293 formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

3.2 Operation

With continued reference to FIG. 1, a pulse laser beam 31 outputted from the laser apparatus 3 may pass through the laser beam direction control unit 34 and be outputted therefrom as the pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply device 26 may be configured to output the target (s) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of: the timing when the target 27 is outputted and the direction into which the target 27 is outputted. Furthermore, the EUV light generation controller 5 may be configured to control at least one of: the timing when the laser apparatus 3 oscillates, the direction in which the pulse laser beam 33 travels, and the position at which the pulse laser beam 33 is focused. It will be appreciated that the various controls mentioned above are merely examples, and other controls may be added as necessary.

4. EUV Light Generation Apparatus Including Target Generation Apparatus

4.1 Configuration

Next, the configuration of the EUV light generation apparatus 1 including a target generation apparatus 7 will be described with reference to FIG. 2. The configuration of the target generation apparatus 7 will be described with reference to FIG. 3.

Figure 2:
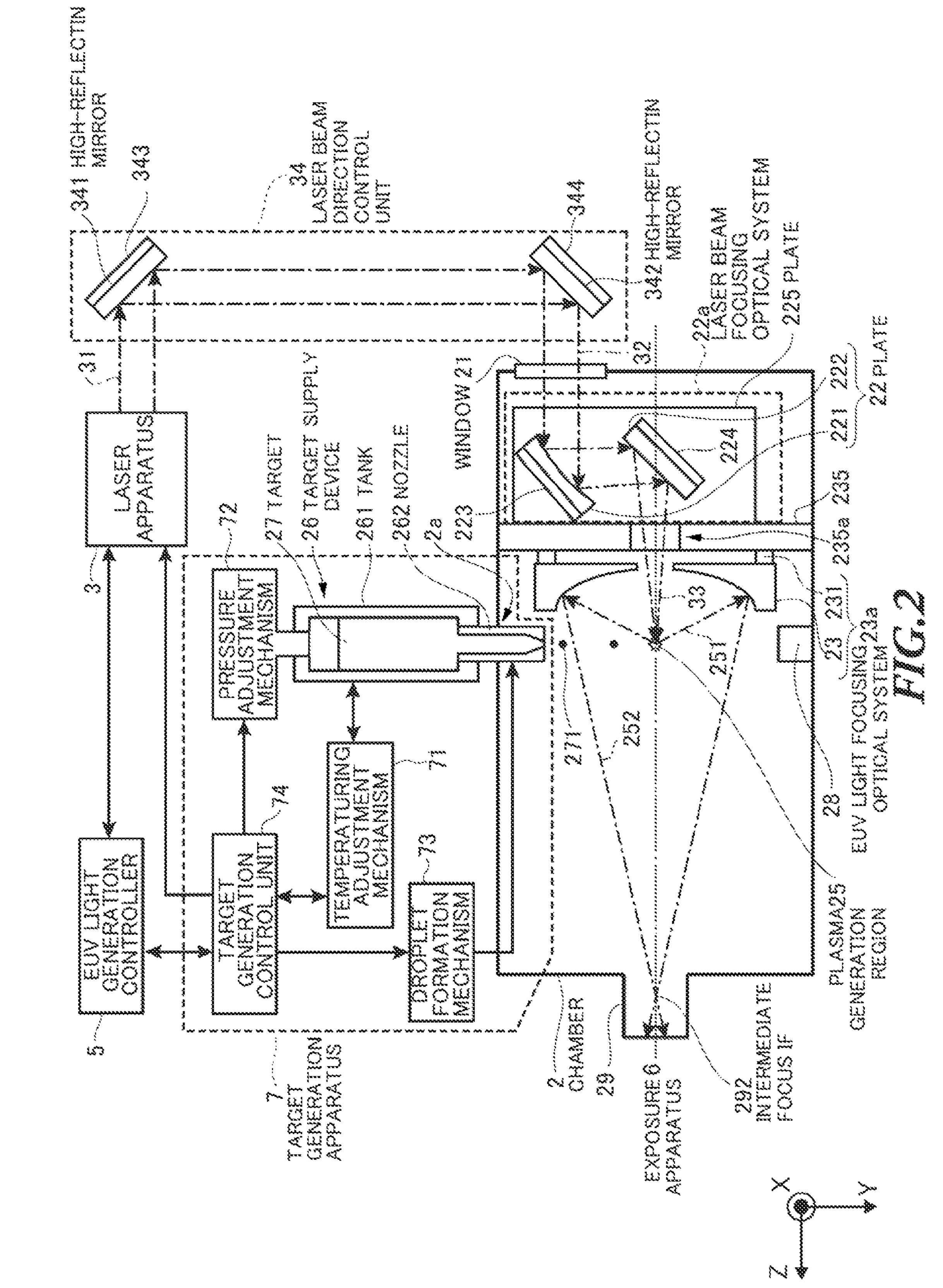
FIG. 2 illustrates the configuration of an EUV light generation apparatus that includes a target generation apparatus.

In FIG. 2, a direction along which the EUV light 252 is conducted from the chamber 2 of the EUV light generation apparatus 1 to the exposure apparatus 6 corresponds to a Z axis. An X axis and a Y axis are axes that are both orthogonal to the Z axis and orthogonal to each other. The coordinate axes in the other drawings are the same as those in FIG. 2.

The chamber 2 of the EUV light generation apparatus 1 may be formed as a hollow sphere or cylinder, for example. A center axis direction of the cylindrical chamber 2 may correspond to the direction along which the EUV light 252 is conducted to the exposure apparatus 6. A target supply opening **2*a* for supplying the target 27 into the chamber 2 from the outside of the chamber 2 may be provided in a side surface of the cylindrical chamber 2. In the case where the chamber 2 is a hollow sphere, the target supply opening 2*a* may be provided in a wall surface of the chamber 2, in a location where the window 21 and the connection part 29** are not provided.

A laser beam focusing optical system **22*a*, an EUV collector optical system 23*a*, the target collector 28, a plate 225, and a plate 235 may be provided inside the chamber 2**.

The plate 235 may be anchored to an inner side surface of the chamber 2. An opening **235*a* through which the pulse laser beam 33 can pass in the thickness direction of the plate 235 may be provided in the center of the plate 235. The direction in which the opening 235*a* extends may match the direction of an axis that passes through the through-hole 24 (see FIG. 1) and the plasma generation region 25**.

The EUV collector optical system **23*a* may be provided on one surface of the plate 235**.

The plate 225 may be provided on another surface of the plate 235 via a three-axis stage (not shown).

The EUV collector optical system **23*a* provided on the one surface of the plate 235 may include the EUV collector mirror 23 and a holder 231**.

The holder 231 may hold the EUV collector mirror 23. The holder 231 that holds the EUV collector mirror 23 may be anchored to the plate 235.

The plate 225 provided on the other surface of the plate 235 may be capable of changing position and orientation via the three-axis stage.

The laser beam focusing optical system **22*a* may be provided on the plate 225**.

The laser beam focusing optical system **22*a* may include the laser beam focusing mirror 22, a holder 223, and a holder 224**.

The laser beam focusing mirror 22 may include an off-axis paraboloid mirror 221 and a flat mirror 222.

The holder 223 may hold the off-axis paraboloid mirror 221. The holder 223 that holds the off-axis paraboloid mirror 221 may be anchored to the plate 225.

The holder 224 may hold the flat mirror 222. The holder 224 that holds the flat mirror 222 may be anchored to the plate 225.

The off-axis paraboloid mirror 221 may be disposed so as to oppose the window 21 provided in a base surface of the chamber 2 and the flat mirror 222.

The flat mirror 222 may be disposed so as to oppose the opening **235*a* and the off-axis paraboloid mirror 221**.

The positions and orientations of the off-axis paraboloid mirror 221 and the flat mirror 222 can be adjusted by changing the position and orientation of the plate 225. This adjustment can be executed in order to focus the pulse laser beam 33, which is reflected light from the pulse laser beam 32 incident on the off-axis paraboloid mirror 221 and the flat mirror 222, at the plasma generation region 25.

The target collector 28 may be disposed upon a straight line extending in a direction along which droplets 271 outputted into the chamber 2 travel.

The laser beam direction control unit 34, the EUV light generation controller 5, and the target generation apparatus 7 may be provided outside the chamber 2.

The laser beam direction control unit 34 may be provided between the window 21 provided in the base surface of the chamber 2 and the laser apparatus 3.

The laser beam direction control unit 34 may include a high-reflecting mirror 341, a high-reflecting mirror 342, a holder 343, and a holder 344.

The holder 343 may hold the high-reflecting mirror 341. The holder 344 may hold the high-reflecting mirror 342.

The holder 343 and the holder 344 may be capable of changing positions and orientations via actuators (not shown).

The high-reflecting mirror 341 may be disposed so as to oppose an emission opening in the laser apparatus 3, from which a pulse laser beam 31 is emitted, and to oppose the high-reflecting mirror 342.

The high-reflecting mirror 342 may be disposed so as to oppose the window 21 in the chamber 2 and the high-reflecting mirror 341.

The positions and orientations of the high-reflecting mirror 341 and the high-reflecting mirror 342 can be adjusted by changing the positions and orientations of the holder 343 and the holder 344. This adjustment can be executed so that the pulse laser beam 32, which is reflected light from the pulse laser beam 31 incident on the high-reflecting mirror 341 and the high-reflecting mirror 342, passes through the window 21 provided in the base surface of the chamber 2.

The EUV light generation controller 5 may send and receive control signals to and from the laser apparatus 3 and may control operations performed by the laser apparatus 3.

The EUV light generation controller 5 may send and receive control signals to and from the actuators of the laser beam direction control unit 34 and the laser beam focusing optical system **22*a*, respectively. Through this, the EUV light generation controller 5 may adjust the travel directions and focus positions of the pulse laser beams 31 to 33**.

The EUV light generation controller 5 may send and receive control signals to and from a target generation control unit 74 (mentioned later) of the target generation apparatus 7 and may control operations performed by the target generation apparatus 7.

Note that the hardware configuration of the EUV light generation controller 5 will be described later with reference to FIG. 17.

The target generation apparatus 7 may be provided on a side surface of the chamber 2.

The target generation apparatus 7 may include the target supply device 26, a temperature adjustment mechanism 71, a pressure adjustment mechanism 72, a droplet formation mechanism 73, and the target generation control unit 74.

The target supply device 26 may include a tank 261 and a nozzle 262.

The tank 261 may be formed as a hollow cylinder. The target 27 may be held within the hollow tank 261.

At least the interior of the tank 261 that holds the target 27 may be configured of a material that does not easily react with the target 27. The material that does not easily react with the target 27 may be any of SiC, $SiO_2$, $Al_2O_2$, molybdenum, tungsten, and tantalum, for example.

The nozzle 262 may be provided in a base surface of the cylindrical tank 261. The nozzle 262 may be disposed within the chamber 2, via the target supply opening 2*a* in the chamber 2. The target supply opening 2*a* can be covered by disposing the target supply device 26 therein. The interior of the chamber 2 can be isolated from the atmosphere as a result.

The interior of the nozzle 262 may be configured of a material that does not easily react with the target 27.

Figure 3:
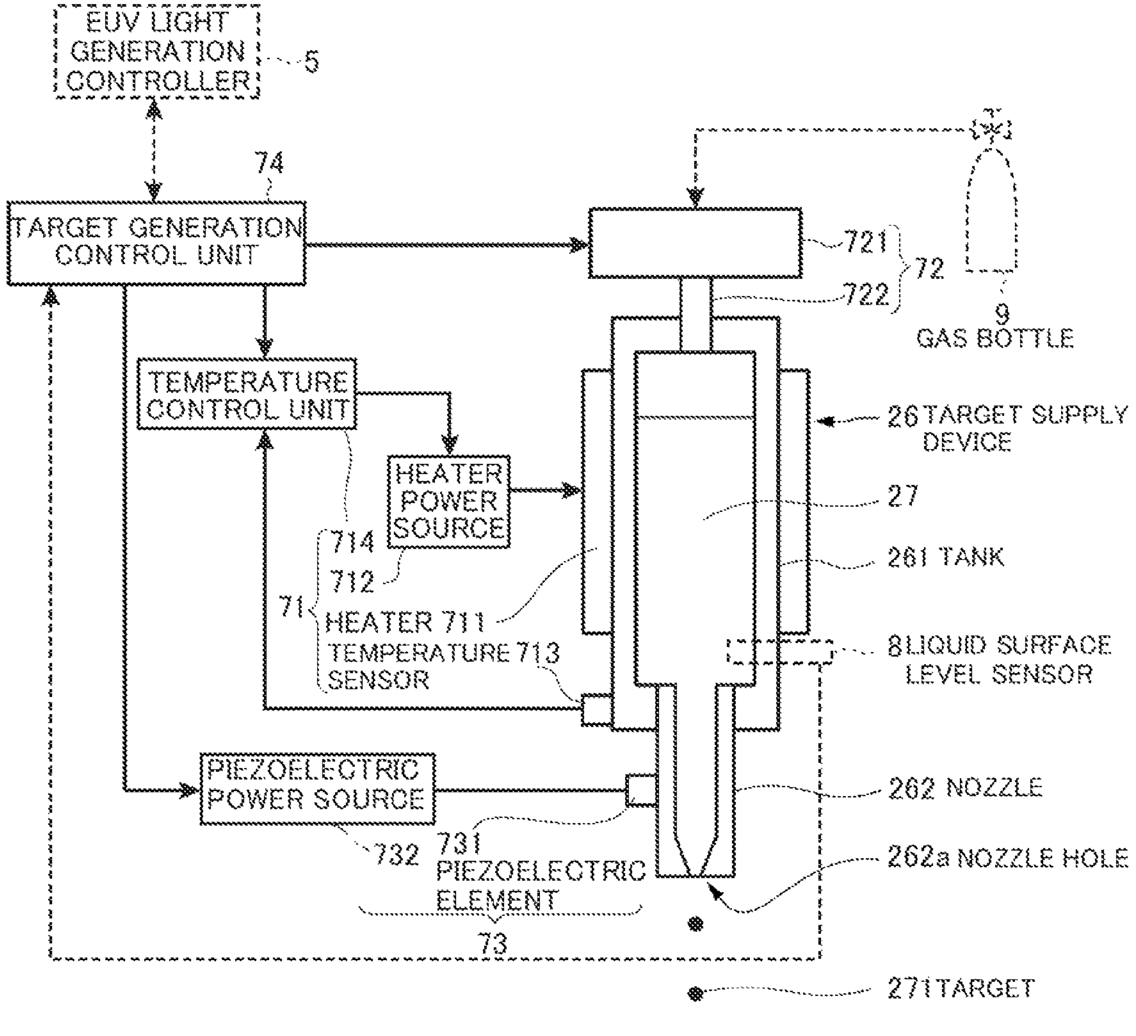
FIG. 3 illustrates the configuration of the target generation apparatus.

One end of the nozzle 262, which has a pipe shape, may be anchored to the hollow tank 261. A nozzle hole 262*a* may be provided in the other end of the pipe-shaped nozzle 262, as shown in FIG. 3. The tank 261 at one end of the nozzle 262 may be located outside of the chamber 2, whereas the nozzle hole 262*a* at the other end of the nozzle 262 may be located within the chamber 2. The plasma generation region 25, which is within the chamber 2, may be located upon a straight line extending along a center axis direction of the nozzle 262. The interiors of the tank 261, the nozzle 262, and the chamber 2 may communicate with each other.

The nozzle hole 262*a* may be formed having a shape for ejecting melted target 27 into the chamber 2 in the form of a jet.

The temperature adjustment mechanism 71 may adjust a temperature of the tank 261.

The temperature adjustment mechanism 71 may include a heater 711, a heater power source 712, a temperature sensor 713, and a temperature control unit 714, as shown in FIG. 3.

The heater 711 may be anchored to an outer side surface of the cylindrical tank 261. The heater 711 anchored to the tank 261 may heat the tank 261. The heater 711 that heats the tank 261 may be connected to the heater power source 712.

The heater power source 712 may supply power to the heater 711. The heater power source 712 that supplies power to the heater 711 may be connected to the temperature control unit 714. The supply of power to the heater 711 by the heater power source 712 may be controlled by the temperature control unit 714.

The temperature sensor 713 may be anchored to an outer side surface of the cylindrical tank 261 in the vicinity of the nozzle 262. The temperature sensor 713 anchored to the tank 261 may be connected to the temperature control unit 714. The temperature sensor 713 may detect a temperature of the tank 261 and output a detection signal to the temperature control unit 714.

The temperature control unit 714 may adjust the power supplied from the heater power source 712 to the heater 711 based on the detection signal outputted from the temperature sensor 713. The temperature control unit 714 may control the heating of the tank 261 by adjusting the power supplied to the heater 711.

The temperature control unit 714 may be connected to the target generation control unit 74.

Note that the hardware configuration of the temperature control unit 714 will be described later with reference to FIG. 17.

According to the configuration described above, the temperature adjustment mechanism 71 can adjust the temperature of the tank 261 based on a control signal from the target generation control unit 74.

The pressure adjustment mechanism 72 may adjust a pressure inside the tank 261 by increasing/decreasing the pressure of a gas introduced into the tank 261.

The pressure adjustment mechanism 72 may include a pressure adjuster 721 and a pipe 722, as shown in FIG. 3.

The pressure adjuster 721 may be provided, via the pipe 722, in a base surface of the cylindrical tank 261 on the opposite side to the nozzle 262.

The pressure adjuster 721 may include, in its interior, a solenoid valve for supply and exhaust, a pressure sensor, and so on. The pressure adjuster 721 may be connected to a gas bottle 9 provided outside of the target generation apparatus 7. The gas with which the gas bottle 9 is filled may be an inert gas such as helium, argon, or the like. The pressure adjuster 721 that is linked to the gas bottle 9 may supply the inert gas to the interior of the tank 261 via the pipe 722.

The pressure adjuster 721 may be connected to an exhaust pump (not shown). The pressure adjuster 721 may exhaust the gas from the interior of the tank 261 via the pipe 722 by running the exhaust pump.

The pressure adjuster 721 can increase or decrease the pressure in the tank 261 by supplying or exhausting the gas to or from the interior of the tank 261. The pressure adjuster 721 that increases or decreases the pressure in the tank 261 may be connected to the target generation control unit 74.

According to the configuration described above, the pressure adjustment mechanism 72 can adjust the pressure in the tank 261 based on a control signal from the target generation control unit 74.

The droplet formation mechanism 73 may form the droplets 271 by cyclically interrupting the flow of the melted target 27 ejected in the form of a jet from the nozzle 262.

The droplet formation mechanism 73 may form the droplets 271 through a continuous jet technique, for example. In the continuous jet technique, a standing wave may be produced in the nozzle 262 by causing the nozzle 262 to vibrate, and the melted target 27 ejected from the nozzle hole 262*a* may be detached cyclically as a result. The detached melted target 27 can form a free interface under its own surface tension, and the droplet 271 can be formed as a result.

The droplet formation mechanism 73 may include a piezoelectric element 731 and a piezoelectric power source 732, as shown in FIG. 3.

The piezoelectric element 731 may be anchored to an outer side surface of the pipe-shaped nozzle 262. The piezoelectric element 731 that is anchored to the nozzle 262 may impart vibrations on the nozzle 262. The piezoelectric element 731 that imparts vibrations on the nozzle 262 may be connected to the piezoelectric power source 732.

The piezoelectric power source 732 may supply power to the piezoelectric element 731. The piezoelectric power source 732 that supplies power to the piezoelectric element 731 may be connected to the target generation control unit 74.

According to the configuration described above, the droplet formation mechanism 73 can form the droplets 271 based on a control signal from the target generation control unit 74.

The target generation control unit 74 may send and receive control signals to and from the EUV light generation controller 5 and may control overall operations performed by the target generation apparatus 7 as a whole.

The target generation control unit 74 may output a control signal to the temperature control unit 714 and control operations performed by the temperature adjustment mechanism 71 that includes the temperature control unit 714.

The target generation control unit 74 may output a control signal to the pressure adjuster 721 and control operations performed by the pressure adjustment mechanism 72 that includes the pressure adjuster 721.

The target generation control unit 74 may output a control signal to the piezoelectric power source 732 and may control operations performed by the droplet formation mechanism 73 that includes the piezoelectric power source 732.

Note that the hardware configuration of the target generation control unit 74 will be described later with reference to FIG. 17.

4.2 Operation

Figure 4:
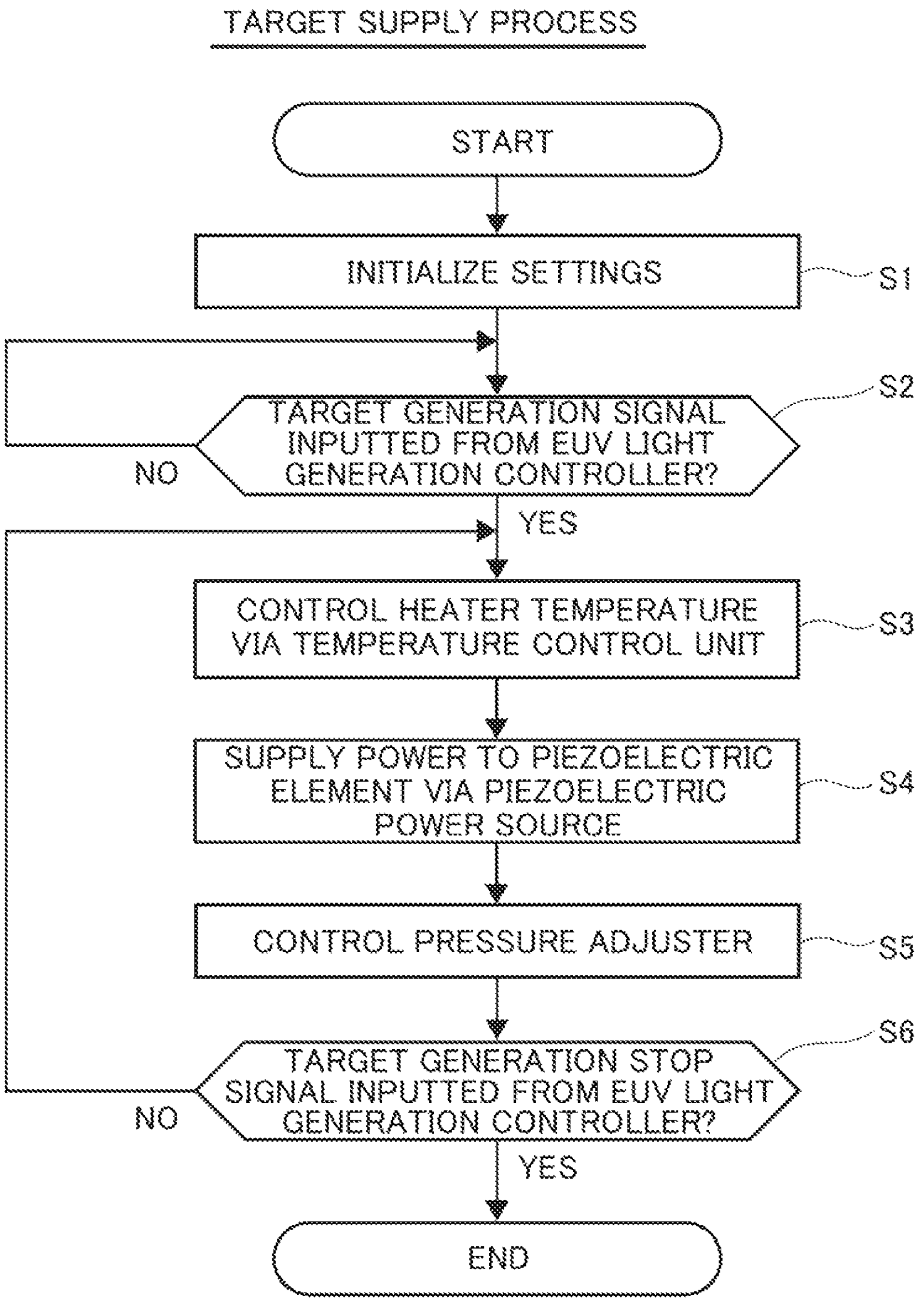
FIG. 4 is a flowchart illustrating a process for supplying a target performed by a target generation control unit.

Operations performed by the target generation apparatus 7 will be described with reference to FIG. 4. Specifically, a process performed by the target generation control unit 74 for supplying the target 27 will be described with reference to FIGS. 2 to 4.

The target generation control unit 74 may carry out the following process upon the input of a signal for activating the target generation apparatus 7, outputted from the EUV light generation controller 5.

In step S1, the target generation control unit 74 may make initialization settings in the target generation apparatus 7.

The target generation control unit 74 may activate the various constituent elements in the target generation apparatus 7 and perform an operational check of those constituent elements. The target generation control unit 74 may then initialize the various constituent elements and set initial setting values therein.

In particular, the target generation control unit 74 may set the pressure adjuster 721 to an initial pressure setting value so that the pressure in the tank 261 has a value close to a vacuum state (1 hPa, for example).

A gas that easily reacts with the target 27 within the tank 261 can be exhausted before the target 27 melts. The inert gas can then be supplied from the gas bottle 9.

Furthermore, the target generation control unit 74 may set an initial temperature setting value for the heater 711 via the temperature control unit 714, so that the temperature of the target 27 reaches a value greater than or equal to the melting point of the target 27. In the case where the target 27 is tin, the initial temperature setting value for the heater 711 may be greater than or equal to 232° C. and less than 300° C., for example. Alternatively, the initial temperature setting value for the heater 711 may be greater than or equal to 300° C.

The target 27 held in the tank 261 can be heated to the melting point of the target 27 or greater. The heated target 27 can melt as a result.

In step S2, the target generation control unit 74 may determine whether or not a target generation signal has been inputted from the EUV light generation controller 5.

The target generation signal may be a control signal for causing the target generation apparatus 7 to supply the target 27 to the plasma generation region 25 within the chamber 2.

The target generation control unit 74 may stand by until the target generation signal is inputted. The target generation control unit 74 may control the heater 711 to continue to heat the target 27 so that the temperature of the target 27 stays within a predetermined range greater than or equal to the melting point of the target 27.

The process may advance to step S3 when the target generation signal is inputted into the target generation control unit 74.

In step S3, the target generation control unit 74 may confirm the temperature of the tank 261 via the temperature control unit 714. The target generation control unit 74 may control the heating performed by the heater 711 by adjusting a temperature setting value as appropriate via the temperature control unit 714.

In step S4, the target generation control unit 74 may supply power to the piezoelectric element 731 via the piezoelectric power source 732.

The piezoelectric element 731 can impart vibrations on the nozzle 262. When the melted target 27 is being ejected from the nozzle hole 262*a*, the droplets 271 can be formed by vibrating the nozzle 262 and causing the melted target 27 to be detached.

Note that the target generation control unit 74 may cause the power to be supplied to the piezoelectric element 731 from the piezoelectric power source 732 at a predetermined frequency. This predetermined frequency may be a frequency at which the melted target 27 ejected from the nozzle hole 262*a* is detached cyclically.

In step S5, the target generation control unit 74 may set the pressure adjuster 721 to a pressure setting value so that the pressure in the tank 261 reaches a pressure at which the target can be supplied. The pressure adjuster 721 may control the pressure in the tank 261 to reach the set pressure setting value. The pressure at which the target can be supplied may be a pressure at which the melted target 27 is ejected from the nozzle hole 262*a* at a constant rate and reaches the plasma generation region 25 at a predetermined velocity.

The melted target 27 held in the tank 261 can be pressurized. The pressurized melted target 27 can flow from the tank 261 toward the nozzle 262 and be ejected from the nozzle hole 262*a* at a constant rate. Vibrations from the piezoelectric element 731 can be imparted at a constant cycle on the melted target 27 ejected at a constant rate, and uniform droplets 271 can be formed at a constant cycle as a result. The droplets 271 that have been formed can be outputted into the chamber 2 and can reach the plasma generation region 25 at the predetermined velocity.

The EUV light generation controller 5 may control a timing at which the pulse laser beam 31 is emitted from the laser apparatus 3 so that the pulse laser beam 33 irradiates the plasma generation region 25 in synchronization with the droplet 271 reaching the plasma generation region 25.

The pulse laser beam 33 that has irradiated the plasma generation region 25 can irradiate the droplet 271 that has reached the plasma generation region 25. The droplet 271 irradiated with the pulse laser beam 33 can be turned into plasma and the EUV light 251 can be generated as a result.

In step S6, the target generation control unit 74 may determine whether or not a target generation stop signal has been inputted from the EUV light generation controller 5.

The target generation stop signal may be a control signal for causing the target generation apparatus 7 to stop the supply of the target 27 to the plasma generation region 25.

The process may return to step S3 when the target generation stop signal is not inputted into the target generation control unit 74. On the other hand, the process may end when the target generation stop signal is inputted into the target generation control unit 74.

4.3 Issue

The EUV light generation apparatus 1 can output a plurality of droplets 271 into the chamber 2. It is desirable for the size of these droplets 271 to be uniform.

The cycle at which the droplets 271 are outputted into the chamber 2 from the target generation apparatus 7 (also called a "generation cycle" of the droplets 271 hereinafter) may be extremely short, such as approximately 10 μs. The size of the droplets 271 may be extremely small, such as approximately 20 μm in diameter.

Accordingly, a technique for accurately measuring whether the plurality of droplets 271 outputted into the chamber 2 are uniform in size is needed.

Furthermore, it is desirable to provide a technique that can measure the size of the droplets 271 outputted into the chamber 2 at a high level of accuracy.

Meanwhile, in the EUV light generation apparatus 1, a remaining amount of the target 27 held in the tank 261 can decrease as the droplets 271 are outputted into the chamber 2. It is desirable to accurately measure the remaining amount of the target 27 held in the tank 261 in real time, even while the EUV light generation apparatus 1 is running. If the remaining amount of the target 27 cannot be accurately measured in real time, a situation can occur in which the supply of the target 27 stops suddenly while the EUV light generation apparatus 1 is running.

The remaining amount of the target 27 held in the tank 261 can be measured by providing a liquid surface level sensor 8 in the tank 261, as shown in FIG. 3.

The target 27 held in the tank 261 can melt while the EUV light generation apparatus 1 is running. Accordingly, the melted target 27 can react with a metal material of which the liquid surface level sensor 8 is configured. The melted target 27 that has reacted with the liquid surface level sensor 8 can produce solid impurities that can clog the nozzle 262.

Even if the liquid surface level sensor 8 is configured of a material that does not easily react with the melted target 27, it can be difficult to accurately measure the remaining amount of the target 27 if the liquid surface of the melted target 27 has dropped below a lower surface of the liquid surface level sensor 8.

Accordingly, a technique that accurately measures the remaining amount of the target 27 held in the tank 261 in real time, even while the EUV light generation apparatus 1 is running, is needed.

Furthermore, it is desirable to provide a technique that can measure the remaining amount of the target 27 held in the tank 261 at a high level of accuracy.

5. Remaining Target Amount Measurement System Provided in EUV Light Generation Apparatus According to First Embodiment 5.1 Configuration The configuration of a remaining target amount measurement system provided in the EUV light generation apparatus 1 according to a first embodiment will be described with reference to FIG. 5.

The remaining target amount measurement system provided in the EUV light generation apparatus 1 according to the first embodiment may include the target generation apparatus 7, a droplet image measurement unit 41, a droplet counter unit 42, and a droplet output calculation control unit 43.

The droplet image measurement unit 41 may measure image data of the droplets 271 outputted into the chamber 2.

The droplet image measurement unit 41 may be provided in the chamber 2.

The droplet image measurement unit 41 may include a light source unit 411, an image capturing unit 412, and an image obtainment control unit 413.

The light source unit 411 and the image capturing unit 412 may be disposed opposing each other, with a target travel path 272, which is a path along which the target 27 outputted into the chamber 2 travels, located therebetween.

The direction along which the light source unit 411 and the image capturing unit 412 oppose each other may be orthogonal to the target travel path 272.

The light source unit 411 may irradiate the droplets 271 that travel along the target travel path 272 with pulses of light.

The light source unit 411 may include a light source 411*a*, an illuminative optical system 411*b*, and a window 411*c*.

The light source 411*a* may be a light source that emits light in pulses, such as a xenon flash lamp or the like.

An amount of time from when the light source 411*a* begins to emit light to when the light source 411*a* stops emitting light is also referred to as an "illumination time $\Delta\tau$". The illumination time $\Delta\tau$ of the light source 411*a* may be significantly shorter than the generation cycle (approximately 10 μs, for example) of the droplets 271. The illumination time $\Delta\tau$ of the light source 411*a* may be 10 ns to 100 ns, for example.

The light source 411*a* may be connected to the droplet output calculation control unit 43. The light source 411*a* may emit light in pulses based on an illumination signal from the droplet output calculation control unit 43, and may emit pulses of light as a result.

The illuminative optical system 411*b* may be an optical system such as a collimator, and may be configured of an optical element such as a lens. The illuminative optical system 411*b* may conduct the pulses of light emitted by the light source 411*a* into the target travel path 272 via the window 411*c*.

The light source unit 411 configured as described above can emit the pulses of light toward the target travel path 272 based on the illumination signal from the droplet output calculation control unit 43. When the droplet 271 traveling along the target travel path 272 passes between the light source unit 411 and the image capturing unit 412, that droplet 271 can be illuminated by the pulses of light emitted from the light source unit 411.

The image capturing unit 412 may capture an image of a shadow from the droplet 271 illuminated by the pulses of light from the light source unit 411.

The image capturing unit 412 may include an image sensor 412*a*, a transfer optical system 412*b*, and a window 412*c*.

The transfer optical system 412*b* may be an optical element such as a pair of lenses. The lenses may be cylindrical lenses. The transfer optical system 412*b* may form, on a light-receiving surface of the image sensor 412*a*, an image of the shadow of the droplet 271 conducted via the window 412*c*.

The image sensor 412*a* may be a two-dimensional image sensor such as a Charge-Coupled Device (CCD), a Complementary Metal Oxide Semiconductor (CMOS), or the like. The image sensor 412*a* may capture an image of the shadow of the droplet 271 formed by the transfer optical system 412*b*. The time interval over which the image sensor 412*a* captures an image (also called a "measurement interval K" of the droplet image measurement unit 41 hereinafter) may be significantly longer than the illumination time $\Delta\tau$ of the light source 411*a*. This interval may be 0.1 s to 1 s, for example.

The image sensor 412*a* may be connected to the droplet output calculation control unit 43. The image sensor 412*a* may open/close a shutter based on a shutter signal from the droplet output calculation control unit 43, and may capture an image of the shadow of the droplet 271. The image sensor 412*a* may capture an image only while the shutter is open. The shutter may be an electrical shutter or a mechanical shutter.

An amount of time from when the shutter is opened to when the shutter is closed for the image sensor 412*a* to capture a single image will also be referred to as a single "image capturing time $\Delta t$".

The image sensor 412*a* may be connected to the image obtainment control unit 413. The image sensor 412*a* may output an image signal indicating an image of the shadow of the droplet 271 that has been captured to the image obtainment control unit 413 each time an image is captured.

According to the configuration described above, the image capturing unit 412 can capture an image of the shadow of the droplet 271 illuminated by the pulses of light based on the shutter signal from the droplet output calculation control unit 43. The image capturing unit 412 can then output the image signal indicating the image of the shadow of the droplet 271 that has been captured to the image obtainment control unit 413.

The image obtainment control unit 413 may generate image data (bitmap data or the like) indicating the image of the shadow of the droplet 271 from the image signal outputted from the image sensor 412*a*. The image obtainment control unit 413 may store the generated image data in association with identification information of that image data. The identification information of the image data may be information indicating the time at which the image data was generated or the like.

The image obtainment control unit 413 may be connected to the droplet output calculation control unit 43. The image obtainment control unit 413 may output the generated image data to the droplet output calculation control unit 43 based on a control signal from the droplet output calculation control unit 43.

Note that the hardware configuration of the image obtainment control unit 413 will be described later with reference to FIG. 17.

According to the configuration described above, the droplet image measurement unit 41 can measure image data indicating images of the droplets 271 outputted into the chamber 2 based on the shutter signals from the droplet output calculation control unit 43 and can output that image data to the droplet output calculation control unit 43.

The droplet counter unit 42 may count the number N of the droplets 271 outputted into the chamber 2.

The droplet counter unit 42 may be provided in the chamber 2.

The droplet counter unit 42 may include a light source unit 421, a light-receiving unit 422, and a counter circuit 423.

The light source unit 421 and the light-receiving unit 422 may be disposed opposing each other, with the target travel path 272 located therebetween.

The direction along which the light source unit 421 and the light-receiving unit 422 oppose each other may be orthogonal to the target travel path 272.

The light source unit 421 may irradiate the droplets 271 that travel along the target travel path 272 with a continuous laser beam.

The light source unit 421 may include a light source 421*a*, an illuminative optical system 421*b*, and a window 421*c*.

The light source 421*a* may be a light source that emits a continuous laser beam, such as a continuous wave (CW) laser oscillator, for example. The beam diameter of the continuous laser beam is significantly greater than the diameter of the droplets 271 (20 μm, for example). The beam diameter of the continuous laser beam may be approximately 1 mm, for example.

The illuminative optical system 421*b* may be an optical element such as a lens. The lens may be a cylindrical lens. The illuminative optical system 421*b* may focus the continuous laser beam emitted by the light source 421*a* on the target travel path 272 via the window 421*c*.

According to the configuration described above, the light source unit 421 can emit the continuous laser beam toward the target travel path 272. When the droplet 271 traveling along the target travel path 272 passes between the light source unit 421 and the light-receiving unit 422, that droplet 271 can be irradiated with the continuous laser beam emitted from the light source unit 421.

The light-receiving unit 422 may receive the continuous laser beam emitted from the light source unit 421 and detect an optical intensity of the continuous laser beam.

The light-receiving unit 422 may include a photodetector 422*a*, a light-receiving optical system 422*b*, and a window 422*c*.

The light-receiving optical system 422*b* may be an optical system such as a collimator, and may be configured of an optical element such as a lens. The light-receiving optical system 422*b* may conduct the continuous laser beam emitted from the light source unit 421 to the photodetector 422*a* via the window 422*c*.

The photodetector 422*a* may be a light-receiving element including a photodiode. The photodetector 422*a* may detect the optical intensity of the continuous laser beam conducted by the light-receiving optical system 422*b*. The photodetector 422*a* may be connected to the counter circuit 423. The photodetector 422*a* may output a detection signal indicating the detected optical intensity to the counter circuit 423.

Note that the configuration of the photodetector 422*a* will be described later with reference to FIG. 18.

According to the configuration described above, the light-receiving unit 422 can detect the optical intensity of the continuous laser beam emitted from the light source unit 421. When the droplet 271 traveling along the target travel path 272 passes between the light source unit 421 and the light-receiving unit 422, the optical intensity of the continuous laser beam that has irradiated the droplet 271 drops at the light-receiving unit 422. The light-receiving unit 422 can output, to the counter circuit 423, a detection signal corresponding to the drop in the optical intensity caused by the droplet 271.

The detection signal outputted by the light-receiving unit 422 may be inputted into the counter circuit 423. The counter circuit 423 may count the number of times the optical intensity has dropped in the inputted detection signal due to the droplets 271. The counter circuit 423 may count the number of times the optical intensity has dropped as the number N of the droplets 271 that have traveled along the target travel path 272.

The counter circuit 423 may be connected to the droplet output calculation control unit 43. The counter circuit 423 may output the counted number N of the droplets 271 to the droplet output calculation control unit 43.

According to the configuration described above, the droplet counter unit 42 can count the number N of the droplets 271 outputted into the chamber 2 based on a control signal from the droplet output calculation control unit 43, and can output the number N to the droplet output calculation control unit 43.

The droplet output calculation control unit 43 may output the illumination signal and a shutter signal to the droplet image measurement unit 41 and may control operations performed by the droplet image measurement unit 41.

The droplet output calculation control unit 43 may include a timer T therein. The timer T may be a timer for measuring an output timing of the illumination signal and the shutter signal. The droplet output calculation control unit 43 can measure the passage of the illumination time $\Delta\tau$, the image capturing time $\Delta t$, and the measurement interval K.

The droplet output calculation control unit 43 may store the image data outputted from the droplet image measurement unit 41. The droplet output calculation control unit 43 may store the number N of the droplets 271 outputted from the droplet counter unit 42. The droplet output calculation control unit 43 may store the image data and the number N of the droplets 271 in association with each other. The droplet output calculation control unit 43 may furthermore store the image data and the number N of the droplets 271 in association with times at which the image data and the number N were obtained.

The droplet output calculation control unit 43 may include a droplet diameter calculation unit 431. The droplet diameter calculation unit 431 may be a program for calculating the diameters of the droplets 271.

The droplet output calculation control unit 43 may calculate the diameters of the droplets 271 indicated by the stored image data using the droplet diameter calculation unit 431. The droplet output calculation control unit 43 may calculate the volume of the droplets 271 based on the diameters of the droplets 271.

The droplet output calculation control unit 43 may calculate a total output amount of the droplets 271 based on the number N of the droplets 271 stored in association with the image data that serves as the basis of the diameter calculation and the volume of the droplets 271 calculated based on the image data.

The total output amount of the droplets 271 may be an amount obtained from a cumulative volume of the droplets 271 outputted from the nozzle 262 into the chamber 2. The total output amount of the droplets 271 may correspond to a consumed amount of the target 27 held in the tank 261.

The droplet output calculation control unit 43 may be connected to the target generation control unit 74. The droplet output calculation control unit 43 may output the calculated total output amount of the droplets 271 to the target generation control unit 74.

Note that the hardware configuration of the droplet output calculation control unit 43 will be described later with reference to FIG. 17.

The target generation control unit 74 may control the overall operations of the remaining target amount measurement system provided in the EUV light generation apparatus 1.

The target generation control unit 74 may store the total output amount of the droplets 271 outputted from the droplet output calculation control unit 43.

The target generation control unit 74 may store the initial amount of the target 27 in advance.

The initial amount of the target 27 may be an amount of the target 27 held in the tank 261 before the droplets 271 are outputted into the chamber 2. Immediately after the target 27 has been added to the tank 261, the initial amount of the target 27 may correspond to the amount that has been added to the tank 261. For example, the initial amount of the target 27 may be determined by measuring the target 27 in advance when the target 27 is added to the tank 261 and inputting the resulting measurement value into the target generation control unit 74. The input of the measurement value may be carried out by an operator, or may be carried out via the EUV light generation controller 5, a network, or the like.

The target generation control unit 74 may include a remaining target amount calculation unit 741. The remaining target amount calculation unit 741 may be a program that measures the remaining amount of the target 27 in the tank 261.

The target generation control unit 74 may calculate the remaining amount of the target 27 held in the tank 261 using the remaining target amount calculation unit 741, based on the total output amount of the droplets 271 and the initial amount of the target 27. The target generation control unit 74 may store the calculated remaining amount of the target 27. The target generation control unit 74 may store the remaining amount of the target 27 in association with a time at which the remaining amount of the target 27 was calculated.

Other configurations of the target generation control unit 74, the configuration of the target generation apparatus 7, and so on may be the same as those shown in FIG. 3.

5.2 Operation

Operations performed by the remaining target amount measurement system provided in the EUV light generation apparatus 1 according to the first embodiment will be described with reference to FIGS. 5 to 8.

A process performed by the target generation control unit 74 for managing a remaining target amount will be described with reference to FIG. 6.

The target generation control unit 74 may carry out the following process upon the input of a control signal for measuring a remaining target amount, outputted from the EUV light generation controller 5.

In step S10, the target generation control unit 74 may load an initial amount V0 of the target 27, stored in advance.

The initial amount V0 of the target 27 may be a remaining amount Vres of the target 27, calculated and stored from a previous remaining target amount management process. In the case where the remaining amount Vres of the target 27 is not stored, the initial amount V0 of the target 27 may be the amount of the target 27 that has been added to the tank 261.

In step S20, the target generation control unit 74 may output an execution start signal for a droplet output calculation process to the droplet output calculation control unit 43.

The execution start signal for the droplet output calculation process may be a control signal through which the target generation control unit 74 causes the droplet output calculation control unit 43 to execute the droplet output calculation process.

The droplet output calculation process may be a process for calculating a total output amount Vsum of the droplets

271 outputted into the chamber 2. The droplet output calculation process can be executed by the droplet output calculation control unit 43.

Note that the droplet output calculation process will be described later with reference to FIG. 7.

In step S30, the target generation control unit 74 may load the total output amount Vsum of the droplets 271 calculated in step S20.

In step S40, the target generation control unit 74 may calculate the remaining amount Vres of the target 27 held in the tank 261.

The target generation control unit 74 may calculate the remaining amount Vres by subtracting the total output amount Vsum loaded in step S30 from the initial amount V0 loaded in step S10.

The target generation control unit 74 may store the calculated remaining amount Vres of the target 27.

In step S50, the target generation control unit 74 may display the remaining amount Vres of the target 27 calculated in step S40 in an external display device.

The external display device may be a display device provided in an operating terminal of the EUV light generation apparatus 1 that can be manipulated by an operator. The external display device may be a display device of an information terminal connected to the EUV light generation apparatus 1 via a network.

In step S60, the target generation control unit 74 may determine whether or not the remaining amount Vres of the target 27 calculated in step S40 is lower than VL.

VL may be a lower limit amount for the remaining amount Vres of the target 27. This lower limit amount may be a minimum amount at which the EUV light generation apparatus 1 can be stopped in a controlled manner.

The minimum amount at which the EUV light generation apparatus 1 can be stopped in a controlled manner may be determined based on a lead time required to replace the target generation apparatus 7 or refill the target 27, a production plan for semiconductor chips, or the like. For example, the minimum amount at which the EUV light generation apparatus 1 can be stopped in a controlled manner may be inputted into the target generation control unit 74 through operations performed by the operator, or may be inputted via the EUV light generation controller 5, a network, or the like.

The minimum amount at which the EUV light generation apparatus 1 can be stopped in a controlled manner may be, for example, 0.253 L (liters), which is an amount used when outputting droplets 271 having a diameter D of 20 μm at a generation frequency f of 100 kHz for one week.

The "generation frequency f" of the droplets 271 may be the number N of the droplets 271 outputted from the target generation apparatus 7 into the chamber 2 per unit of time.

The target generation control unit 74 may return the process to step S20 when the remaining amount Vres is not lower than the lower limit amount VL. On the other hand, the target generation control unit 74 may advance the process to step S70 when the remaining amount Vres is lower than the lower limit amount VL.

In step S70, the target generation control unit 74 may notify the EUV light generation controller 5 that the remaining amount Vres of the target 27 is low. At the same time, the target generation control unit 74 may display an indication that the remaining amount Vres of the target 27 is low in the external display device.

The droplet output calculation process performed by the droplet output calculation control unit 43 will be described with reference to FIG. 7.

Figure 6:
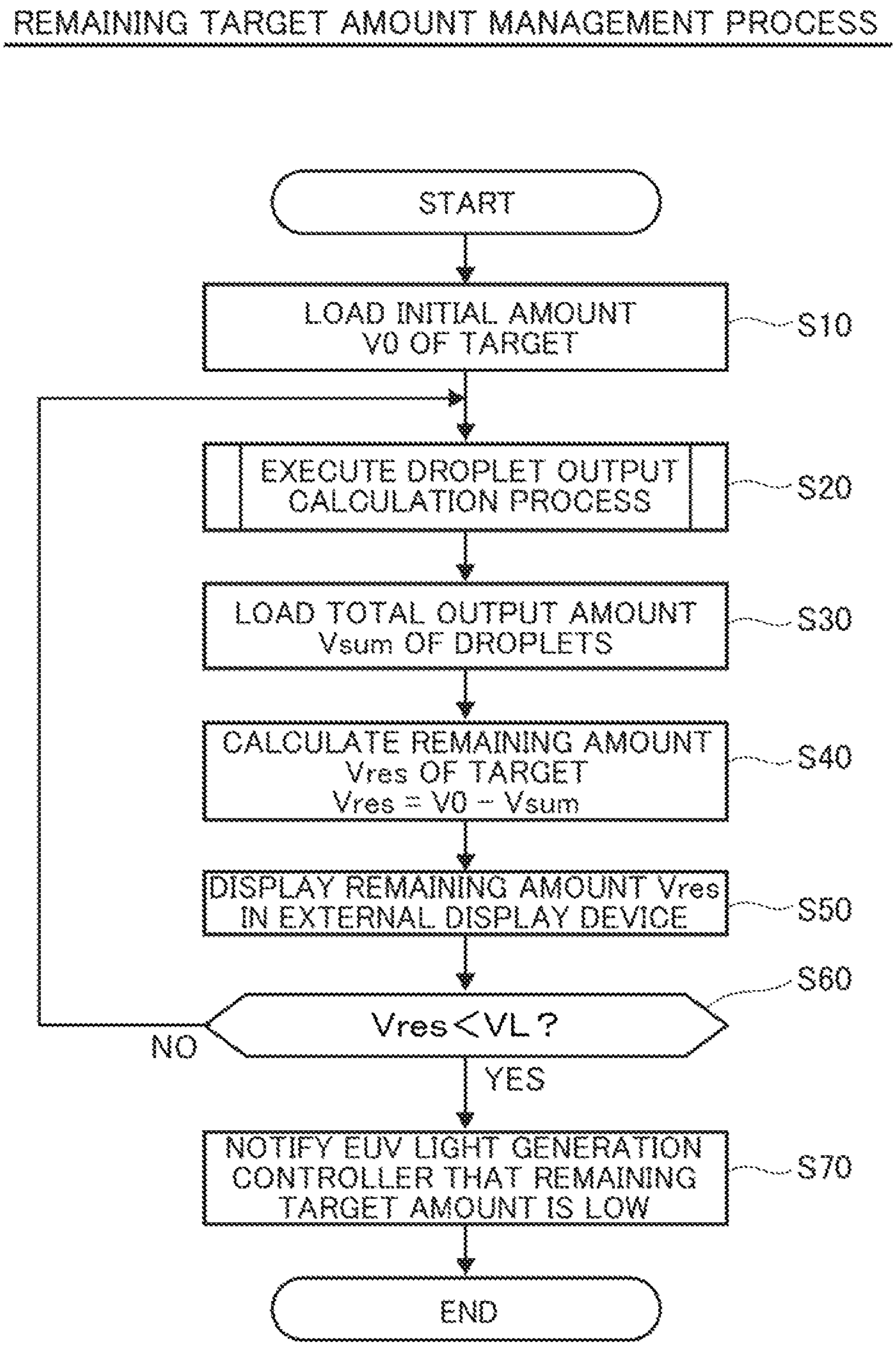
FIG. 6 is a flowchart illustrating a process for managing a remaining target amount performed by a target generation control unit shown in FIG. 5.

The droplet output calculation control unit 43 may perform the following process when the execution start signal for the droplet output calculation process, outputted in step S20 of FIG. 6, has been inputted.

In step S201, the droplet output calculation control unit 43 may reset the total output amount Vsum to 0.

In step S202, the droplet output calculation control unit 43 may reset the timer T and then start the timer T.

In step S203, the droplet output calculation control unit 43 may reset the counter circuit 423 and then start the count performed by the counter circuit 423.

In step S204, the droplet output calculation control unit 43 may output, to the image sensor 412*a*, the shutter signal for opening the shutter of the image sensor 412*a* if it is time for the shutter to open.

The droplet output calculation control unit 43 may store the value of the timer T at the time when the shutter signal for opening the shutter is outputted.

In step S205, the droplet output calculation control unit 43 may output the illumination signal to the light source 411*a* of the droplet image measurement unit 41 for the predetermined illumination time Δτ if it is time for the light source 411*a* to emit light. The light source 411*a* can emit a pulse of light to the target travel path 272 for the duration of the illumination time Δτ.

In step S206, when the predetermined image capturing time Δt has elapsed, the droplet output calculation control unit 43 may output the shutter signal for closing the shutter of the image sensor 412*a* to the image sensor 412*a*.

The image capturing time Δt may be an amount of time spanning from when the shutter of the image sensor 412*a* opens in step S204 to when the shutter closes in step S206. The image sensor 412*a* can capture an image of the shadow of the droplet 271 formed during the image capturing time Δt.

The droplet output calculation control unit 43 may store the value of the timer T at the time when the shutter signal for closing the shutter is outputted.

In step S207, the droplet output calculation control unit 43 may obtain the image data of the shadow of the droplet 271 captured in step S206 from the image obtainment control unit 413.

In step S208, the droplet output calculation control unit 43 may determine whether or not the droplet 271 is present in the image data obtained in step S207.

In the case where the droplet 271 is present in the obtained image data, the droplet output calculation control unit 43 may advance the process to step S209. On the other hand, in the case where the droplet 271 is not present in the obtained image data, the droplet output calculation control unit 43 may advance the process to step S210.

In step S209, the droplet output calculation control unit 43 may calculate the diameter D of the droplet 271 present in the obtained image data.

Note that the process for calculating the diameter D of the droplet 271 will be described later with reference to FIG. 8A.

In step S210, the droplet output calculation control unit 43 may set the diameter D of the droplet 271 to 0.

In the case where the droplet 271 is not present in the image data obtained in step S207, the droplet output calculation control unit 43 can consider the diameter D of the droplet 271 to be 0.

In step S211, the droplet output calculation control unit 43 may calculate a volume V of the droplet 271 based on the diameter D of the droplet 271 calculated in step S209 or step S210.

The droplet output calculation control unit 43 may calculate the volume V of the droplet 271 through the formula $V=(4/3)\Pi(D/2)^3$.

In step S212, the droplet output calculation control unit 43 may determine whether or not ΔT, which represents a difference between the value of the timer T stored in step S206 and the value of the timer T in step S212, is greater than the predetermined measurement interval K.

This step S212 can be equivalent to determining whether or not the measurement interval K has elapsed following the end of a single instance of image capturing. ΔT being greater than the measurement interval K can be equivalent to the measurement interval K having elapsed.

The droplet output calculation control unit 43 may stand by if ΔT is not greater than the measurement interval K. On the other hand, the droplet output calculation control unit 43 may advance the process to step S213 if ΔT is greater than the measurement interval K.

In step S213, the droplet output calculation control unit 43 may reset the timer T and then start the timer T.

In step S214, the droplet output calculation control unit 43 may load the number N of the droplets 271 outputted from the counter circuit 423.

In step S215, the droplet output calculation control unit 43 may reset the counter circuit 423 and then start the count performed by the counter circuit 423.

In step S216, the droplet output calculation control unit 43 may update the total output amount Vsum based on the volume V of the droplets 271 calculated in step S211 and the number N of the droplets 271 loaded in step S214.

The droplet output calculation control unit 43 may update the total output amount Vsum by adding a value V·N, in which the volume V of the droplets 271 is multiplied by the number N of the droplets 271, to the total output amount Vsum.

V·N can be equivalent to the amount of the droplets 271 outputted into the chamber 2 during the measurement interval K.

In step S217, the droplet output calculation control unit 43 may determine whether or not a droplet output calculation process execution stop signal, outputted from the target generation control unit 74, has been inputted.

The droplet output calculation process execution stop signal may be a control signal through which the target generation control unit 74 causes the droplet output calculation control unit 43 to stop executing the droplet output calculation process.

The droplet output calculation control unit 43 may stop calculating the total output amount Vsum of the droplets 271 if the execution stop signal is inputted. On the other hand, the droplet output calculation control unit 43 may return the process to step S204 if the execution stop signal is not inputted.

The process through which the droplet output calculation control unit 43 calculates the diameter D of the droplets 271 will be described with reference to FIGS. 8A and 8B.

Figure 7:
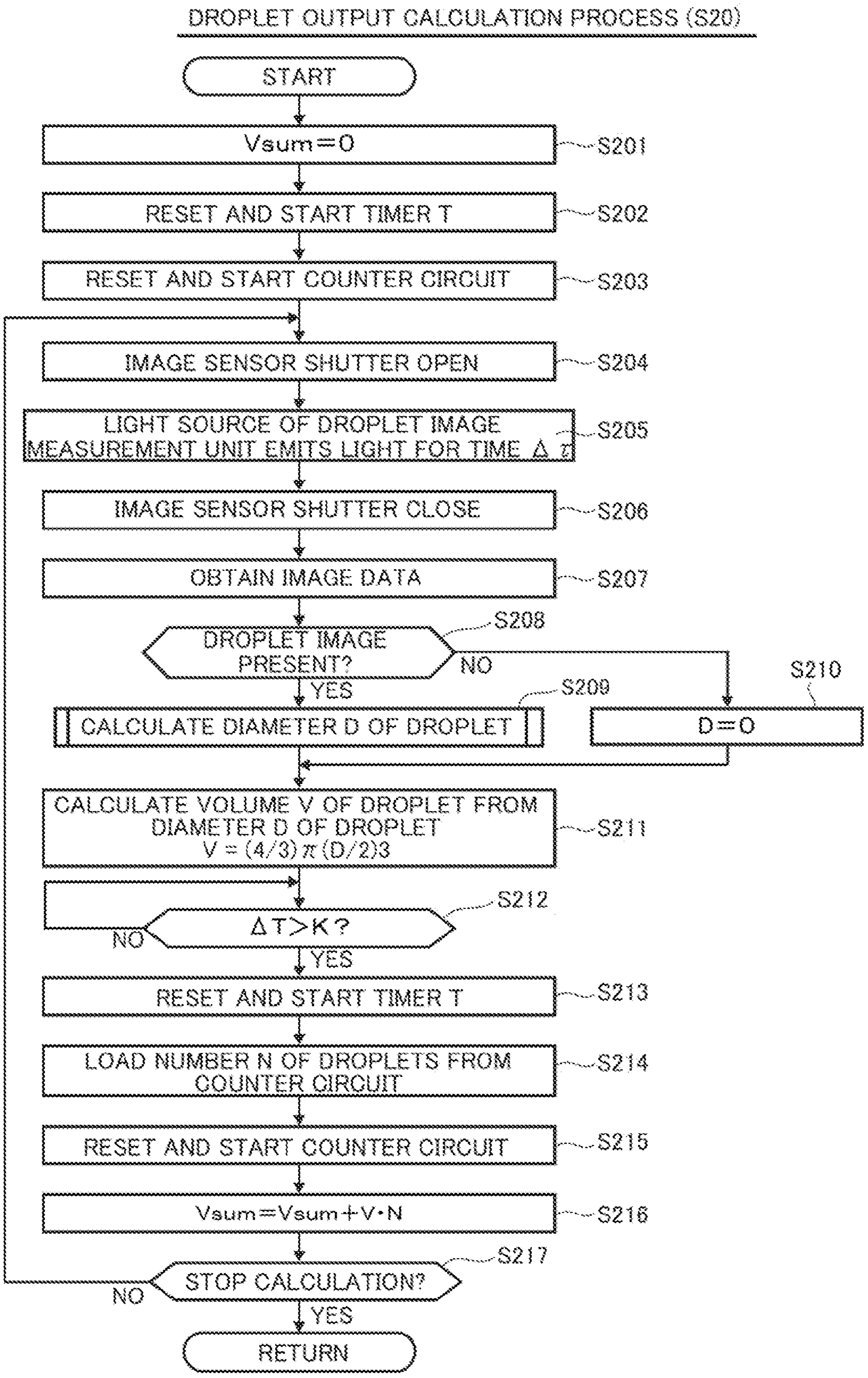
FIG. 7 is a flowchart illustrating a process performed by a droplet output calculation control unit shown in FIG. 5.

In step S2091, the droplet output calculation control unit 43 may calculate the diameter D of the droplets 271 from the shadow of the image of those droplets 271 present in the image data obtained in step S207 of FIG. 7.

The image data of the droplets 271 captured by the image sensor 412*a* that partially configures the image capturing unit 412 may represent an image such as that shown in FIG. 8B, which corresponds to a single instance of image capturing.

In the image of the droplets 271 present in the image data, the droplet output calculation control unit 43 may take a width of the image of the droplets 271 in a direction orthogonal to the direction in which the droplets 271 travel as the diameter D of the droplets 271.

If the shadow corresponding to a single substantially spherical droplet 271 is captured as a single substantially spherical image, the droplet output calculation control unit 43 may calculate the diameter D through the following method. That is, the droplet output calculation control unit 43 may take an average of the width of the image of the droplet 271 in the travel direction and the width of the image of the droplet 271 in the direction orthogonal to the travel direction as the diameter D of the droplet 271.

As shown in FIG. 8B, a plurality of the droplets 271 can be present in the image data obtained in a single instance of image capturing depending on how the image capturing time Δt of the image sensor 412*a* is set.

In the first embodiment, the image capturing time Δt of the image sensor 412*a* may be set as follows so that a plurality of the droplets 271 are present in the image data obtained through a single instance of image capturing.

In an image capturing range of the image sensor 412*a*, represented by Ay×Bz, a length of the image capturing range in the travel direction of the droplets 271 is taken as A. A distance, in the travel direction of the droplets 271, between two adjacent droplets 271 that have been outputted sequentially is taken as d. A travel velocity of the droplets 271 is taken as v. Here, in the case where the transfer optical system 412*b* is an enlarging optical system, A may be a value converted to the actual length of the image capturing range in the travel direction of the droplets 271. Meanwhile, A and d may be defined as amounts in units of pixel numbers captured by the image sensor 412*a*. In the case where A and d are defined as amounts in units of pixel numbers, v may also be defined as the number of pixels passed per unit of time.

Accordingly, in the first embodiment, the image capturing time Δt may be set so as to fulfill the relationship indicated in the following formula.

$$\Delta t<d/v$$

The right side of the above formula (d/v) can indicate an amount of time in which the images of two adjacent droplets 271 that have been outputted sequentially do not overlap so as to be inseparable.

Through this, the image sensor 412*a* that partially configures the image capturing unit 412 can, in a single instance of image capturing, capture the images of two adjacent droplets 271 that have been outputted sequentially, without the images overlapping.

Furthermore, in the first embodiment, the image capturing time Δt may be set so as to fulfill the relationship indicated in the following formula.

$$\Delta t>(d-A)/v$$

The right side of the above formula ((d−A)/v) can indicate an amount of time for which the images of two adjacent droplets 271 that have been outputted sequentially can be present in the image capturing range.

Through this, the image sensor 412*a* that partially configures the image capturing unit 412 can, in a single instance of image capturing, capture the images of two adjacent droplets 271 that have been outputted sequentially, so that the images are present in the image capturing range.

Accordingly, if the image capturing time Δt fulfills the relationship $(d-A)/v<\Delta t<d/v$, the images of two adjacent droplets 271 that have been outputted sequentially can be captured within the image capturing range every time, without overlapping.

Note that the image capturing time $\Delta t$ may be set to fulfill the relationship $0<\Delta t<d/v$ in the case where $d \leq A$.

The image capturing unit 412 can repeatedly capture images of the droplets 271 every measurement interval K using the image capturing time $\Delta t$ set as described above.

Note that the travel velocity v of the droplets 271 may be set to a predetermined velocity.

In addition, the travel velocity v of the droplets 271 may be calculated through a method such as that described below. In particular, the travel velocity v may be calculated through a method such as that described below if the shadow corresponding to a single droplet 271 has been captured as a single image in the image data obtained in a single instance of image capturing, as shown in FIG. 8B.

The droplet output calculation control unit 43 may compare two pieces of image data obtained by capturing images of the same droplet 271 at different times. The droplet output calculation control unit 43 may calculate the displacement of a specific droplet 271 between the two pieces of image data as the distance the droplet 271 has traveled during the measurement interval K. The droplet output calculation control unit 43 can then calculate the travel velocity v of the droplet 271 by dividing the calculated travel distance of the droplet 271 by the measurement interval K.

5.3 Effect

In the first embodiment, the diameters D of the droplets 271 actually outputted into the chamber 2 can be measured in real time while the EUV light generation apparatus 1 is running. Thus according to the first embodiment, whether the droplets 271 actually outputted into the chamber 2 are uniform in size can be accurately measured in real time even while the EUV light generation apparatus 1 is running.

Furthermore, in the first embodiment, the distance between two droplets 271 actually outputted into the chamber 2 can be measured in real time while the EUV light generation apparatus 1 is running.

Furthermore, in the first embodiment, the droplets 271 actually outputted into the chamber 2 can be detected and the number N thereof can be counted in real time while the EUV light generation apparatus 1 is running. Thus according to the first embodiment, the total output amount Vsum of the droplets 271 actually outputted into the chamber 2 can be measured. Therefore, according to the first embodiment, the remaining amount of the target 27 can be accurately measured in real time even while the EUV light generation apparatus 1 is running.

5.4 Variation on First Embodiment

The configuration of a remaining target amount measurement system provided in the EUV light generation apparatus 1 according to a variation on the first embodiment will be described with reference to FIG. 9.

Figure 5:
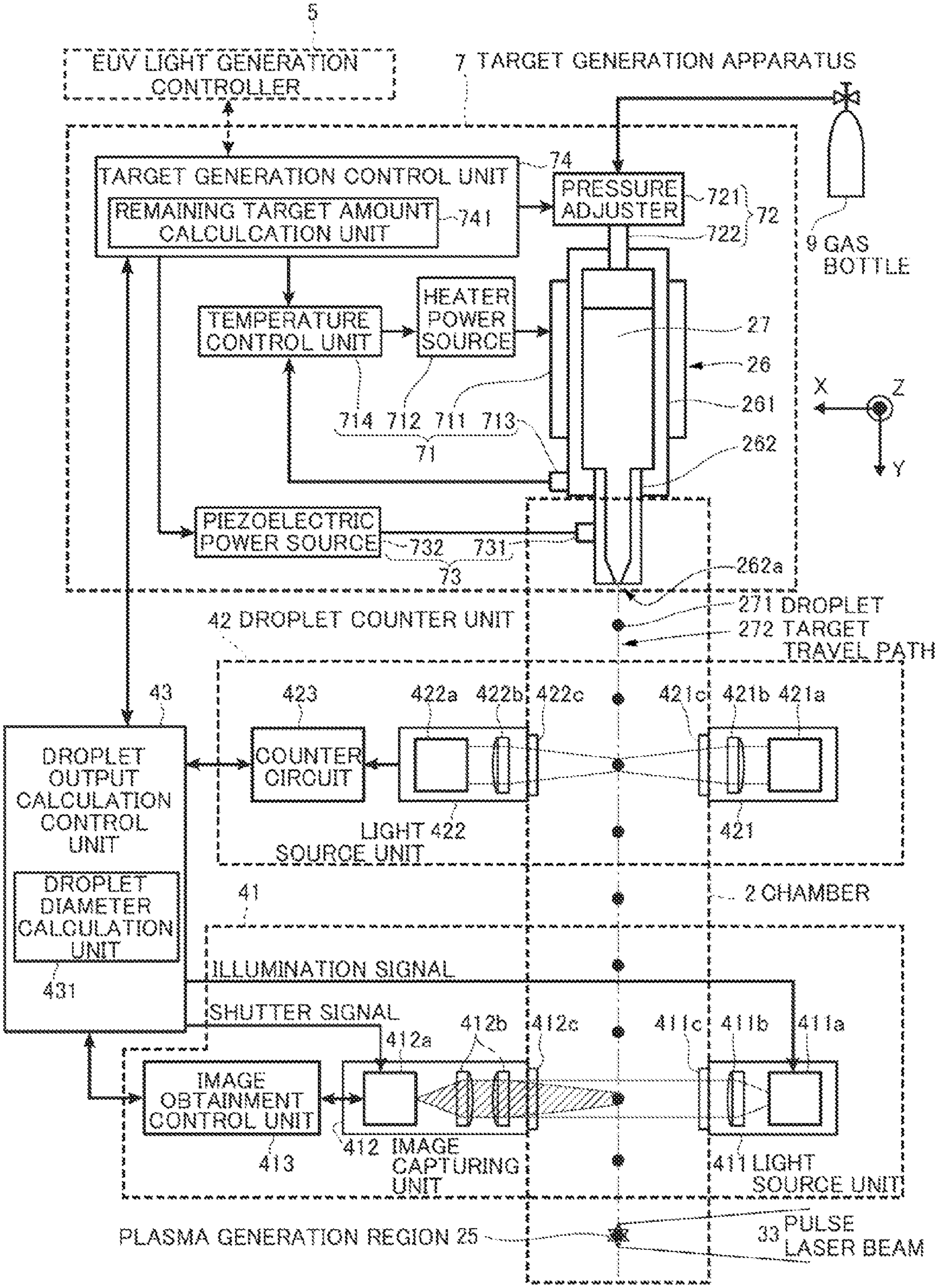
FIG. 5 is a diagram illustrating the configuration of a remaining target amount measurement system provided in an EUV light generation apparatus according to a first embodiment.
Figure 9:
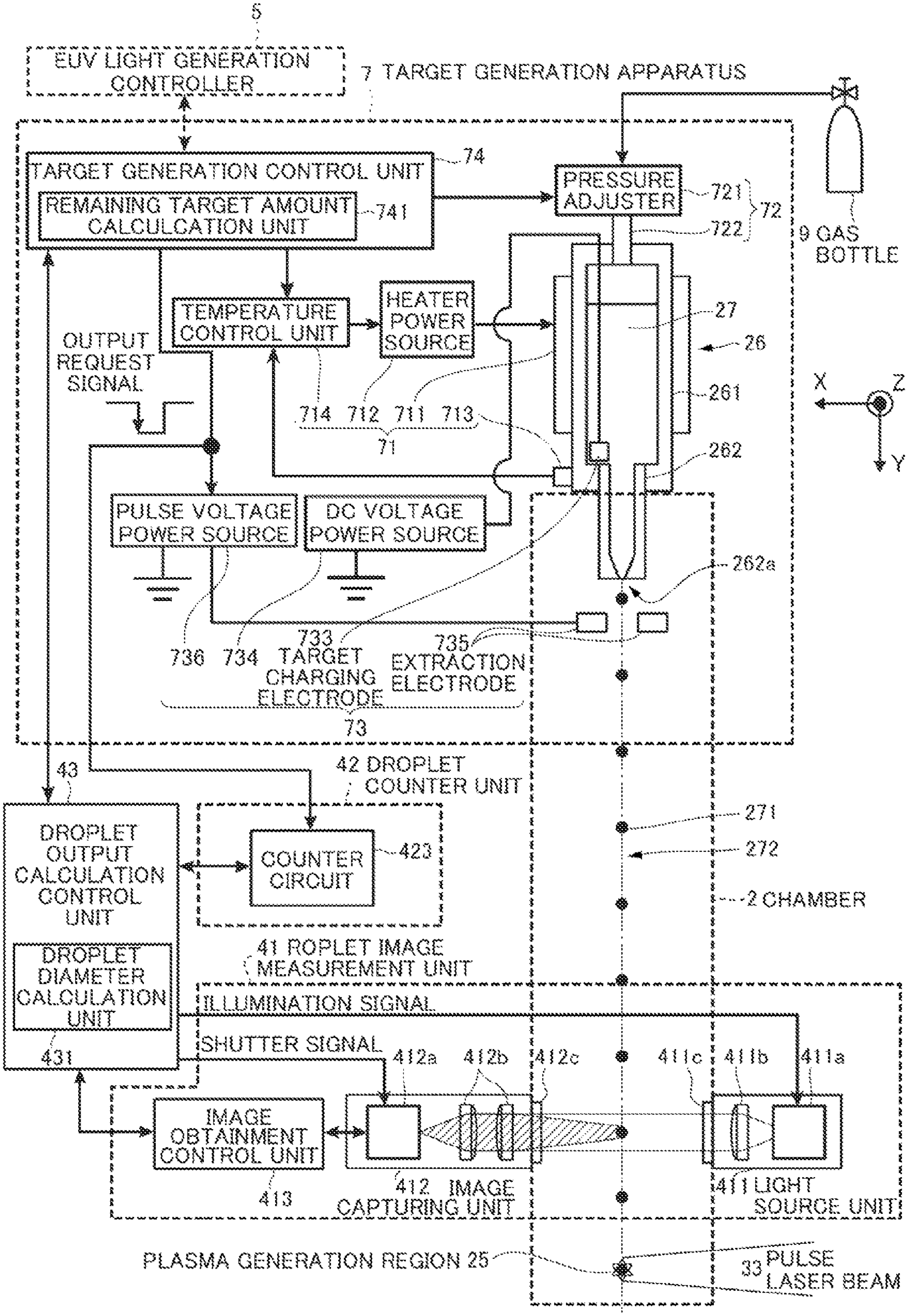
FIG. 9 is a diagram illustrating the configuration of a remaining target amount measurement system provided in an EUV light generation apparatus according to a variation on the first embodiment.

The configuration of the remaining target amount measurement system provided in the EUV light generation apparatus 1 according to the variation on the first embodiment differs from the configuration shown in FIG. 5 and described in the first embodiment in terms of the configurations of the droplet formation mechanism 73 and the droplet counter unit 42, as shown in FIG. 9. The other configurations are the same as those shown in FIG. 5 and described in the first embodiment.

Figure 8:
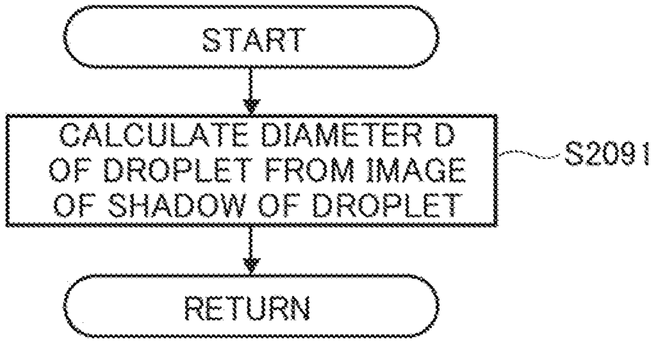
FIG. 8A is a flowchart illustrating a process for calculating the diameter of a droplet shown in FIG. 7.
FIG. 8B schematically illustrates an image of a droplet captured by an image capturing unit shown in FIG. 5.
Figure 8:
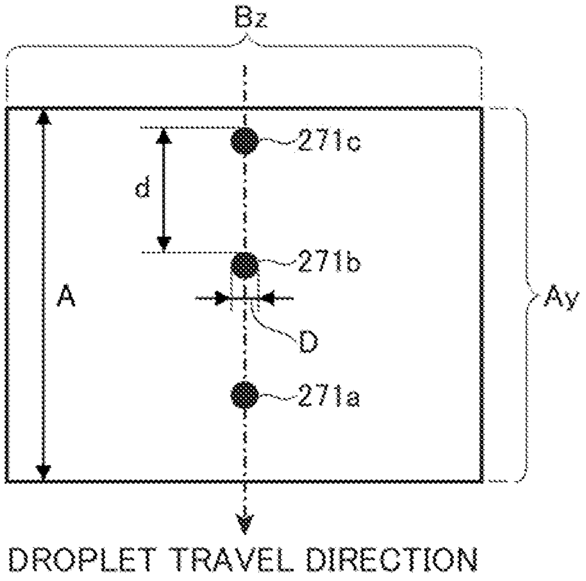

Likewise, operations performed by the remaining target amount measurement system provided in the EUV light generation apparatus 1 according to the variation on the first embodiment are partly the same as those shown in FIGS. 6 to 8 and described in the first embodiment.

Descriptions of configurations and operations identical to those in the first embodiment will be omitted.

The droplet formation mechanism 73 according to the first embodiment and shown in FIG. 5 can form the droplets 271 through the continuous jet technique.

The droplet formation mechanism 73 according to the variation shown in FIG. 9 may form the droplets 271 through an electrostatic extraction technique.

The droplet formation mechanism 73 according to the variation shown in FIG. 9 may include a target charging electrode 733, a DC voltage power source 734, an extraction electrode 735, and a pulse voltage power source 736.

The target charging electrode 733 may be anchored to the interior of the tank 261 in the vicinity of the nozzle 262. The target charging electrode 733 anchored to the interior of the tank 261 may be connected to the DC voltage power source 734. The DC voltage power source 734 may apply a voltage to the target charging electrode 733.

As a result, a voltage can also be applied to the target 27 that is in contact with the target charging electrode 733.

The extraction electrode 735 may be formed in a ring shape. The extraction electrode 735 may be provided in the target travel path 272, distanced from the nozzle hole 262*a*. A center axis of the ring-shaped extraction electrode 735 and a center axis of the nozzle 262 may be located along the same straight line.

The extraction electrode 735 may be connected to the pulse voltage power source 736. The pulse voltage power source 736 may apply a pulse voltage to the extraction electrode 735.

The extraction electrode 735 to which the pulse voltage has been applied can produce electrostatic force between the extraction electrode 735 and the target 27. As a result of the electrostatic force produced between the target 27 and the extraction electrode 735, the target 27 can be extracted from the nozzle hole 262*a* and can be eventually detached. The detached target 27 can form a free interface under its own surface tension, and the droplet 271 can be formed as a result. At this time, the droplet 271 may be charged.

The pulse voltage power source 736 may be connected to the target generation control unit 74. The target generation control unit 74 may output an output request signal to the pulse voltage power source 736 in accordance with a timing at which the droplet 271 is to be outputted into the chamber 2.

The pulse voltage power source 736 may apply the pulse voltage to the extraction electrode 735 based on the output request signal from the target generation control unit 74.

With the electrostatic extraction technique, the droplet 271 can be outputted at a desired timing by applying the pulse voltage to the extraction electrode 735 at the desired timing and producing the electrostatic force between the extraction electrode 735 and the target 27.

The connection between the target generation control unit 74 and the pulse voltage power source 736 may branch so that the target generation control unit 74 is also connected to the counter circuit 423 of the droplet counter unit 42. As a result, the target generation control unit 74 can output the output request signal, which is outputted to the pulse voltage power source 736, to the counter circuit 423 as well, at the same time.

The droplet counter unit 42 according to the variation shown in FIG. 9 may be provided with the counter circuit 423, but not with the light source unit 421 and the light-receiving unit 422.

The counter circuit 423 may be inputted with the output request signals from the target generation control unit 74 connected to the pulse voltage power source 736. The counter circuit 423 may count the inputted output request signals and take the counter number as the number N of the droplets 271 outputted into the chamber 2.

According to the configuration described above, in the variation on the first embodiment, the number N of the droplets 271 can be counted and the total output amount Vsum can be calculated even though the droplet counter unit 42 does not include the light source unit 421 and the light-receiving unit 422.

Therefore, according to the variation on the first embodiment, the light source unit 421 and the light-receiving unit 422 can be omitted from the droplet counter unit 42, and thus the remaining target amount measurement system provided in the EUV light generation apparatus 1 can be simplified.

6. Remaining Target Amount Measurement System Provided in EUV Light Generation Apparatus According to Second Embodiment

6.1 Configuration

The configuration of a remaining target amount measurement system provided in the EUV light generation apparatus 1 according to a second embodiment will be described with reference to FIG. 10.

Figure 10:
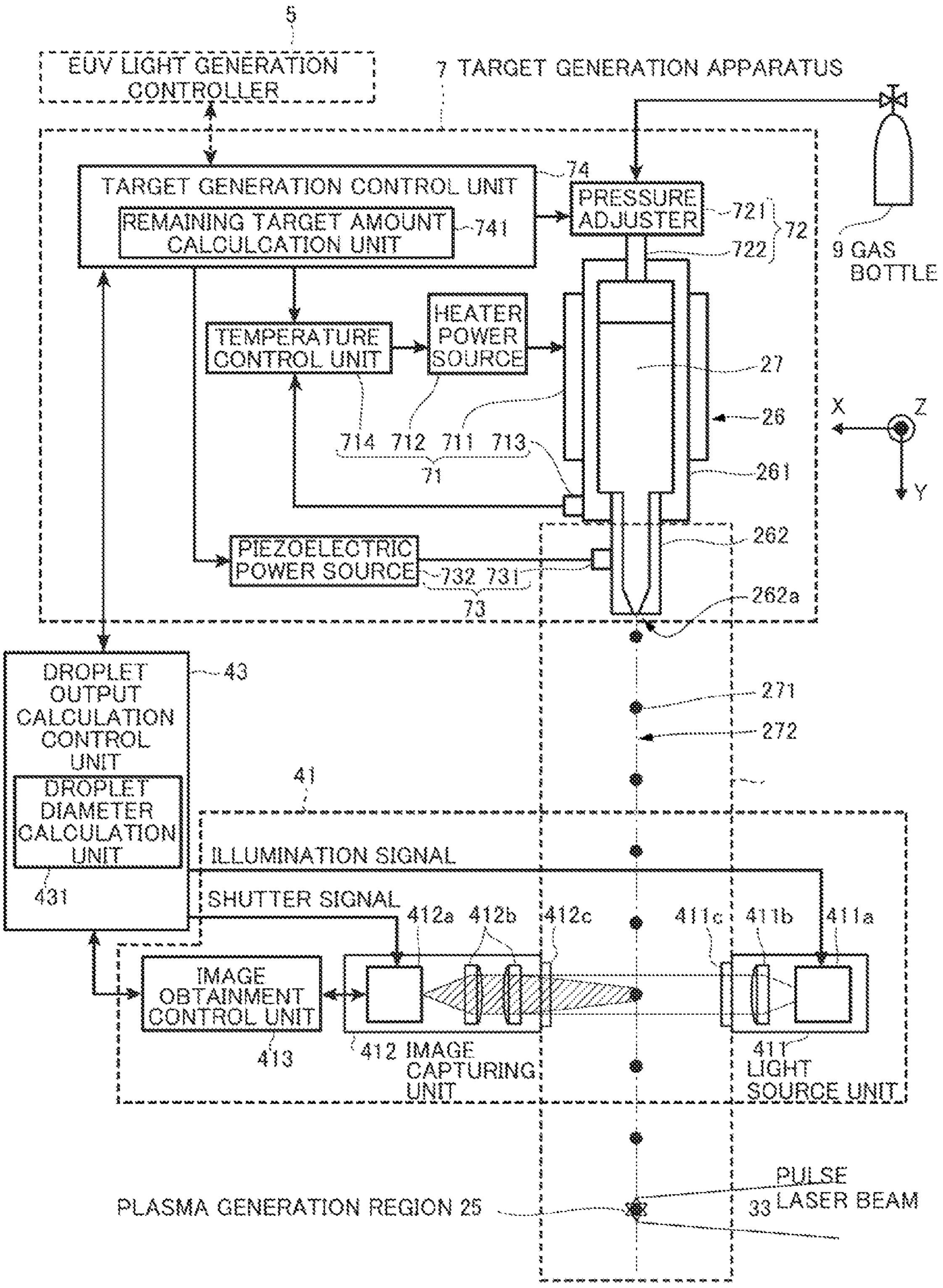
FIG. 10 is a diagram illustrating the configuration of a remaining target amount measurement system provided in an EUV light generation apparatus according to a second embodiment.

The configuration of the remaining target amount measurement system provided in the EUV light generation apparatus 1 according to the second embodiment differs from the configuration shown in FIG. 5 and described in the first embodiment in that the droplet counter unit 42 has been omitted, as shown in FIG. 10. The other configurations are the same as those described in the first embodiment.

Descriptions of configurations identical to those in the first embodiment will be omitted.

In the first embodiment, the number N of the droplets 271 may actually be counted by the counter circuit 423 of the droplet counter unit 42. Furthermore, in the first embodiment, the droplet output calculation control unit 43 may calculate the total output amount Vsum of the target 27 using the number N actually counted by the counter circuit 423.

In the second embodiment, the number N of the droplets 271 may be calculated from the generation frequency f of the droplets 271 and the measurement interval K. Furthermore, in the second embodiment, the droplet output calculation control unit 43 may calculate the total output amount Vsum of the target 27 using the number N calculated from the generation frequency f and the measurement interval K.

Note that in the first embodiment, the illumination time $\Delta\tau$ (10 ns to 100 ns, for example) of the light source 411*a* in the droplet image measurement unit 41 may be significantly shorter than the generation cycle (approximately 10 μs, for example) of the droplets 271.

In the second embodiment, the illumination time $\Delta\tau$ of the light source 411*a* in the droplet image measurement unit 41 may be approximately the same as or shorter than the generation cycle of the droplets 271. The generation cycle of the droplets 271 may be approximately 10 μs, for example. The illumination time $\Delta\tau$ according to the second embodiment may be approximately 1 to 5 μs, for example. Note that these values are merely examples, and it is preferable for the values to be selected as appropriate in accordance with the apparatus being employed.

6.2 Operation

Operations performed by the remaining target amount measurement system provided in the EUV light generation apparatus 1 according to the second embodiment will be described with reference to FIGS. 10 to 12.

Figure 11:
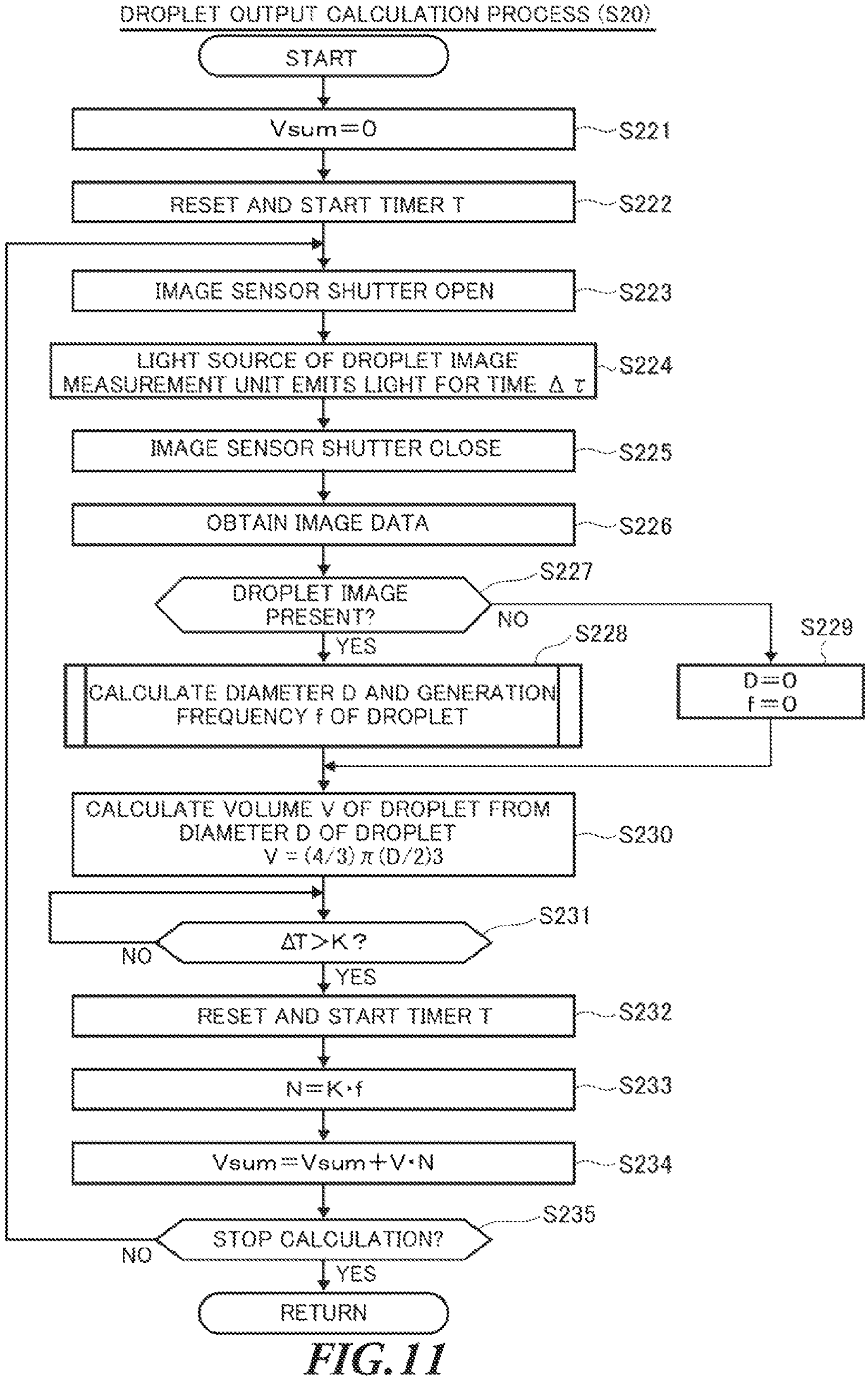
FIG. 11 is a flowchart illustrating a process performed by a droplet output calculation control unit shown in FIG. 10.
Figure 12:
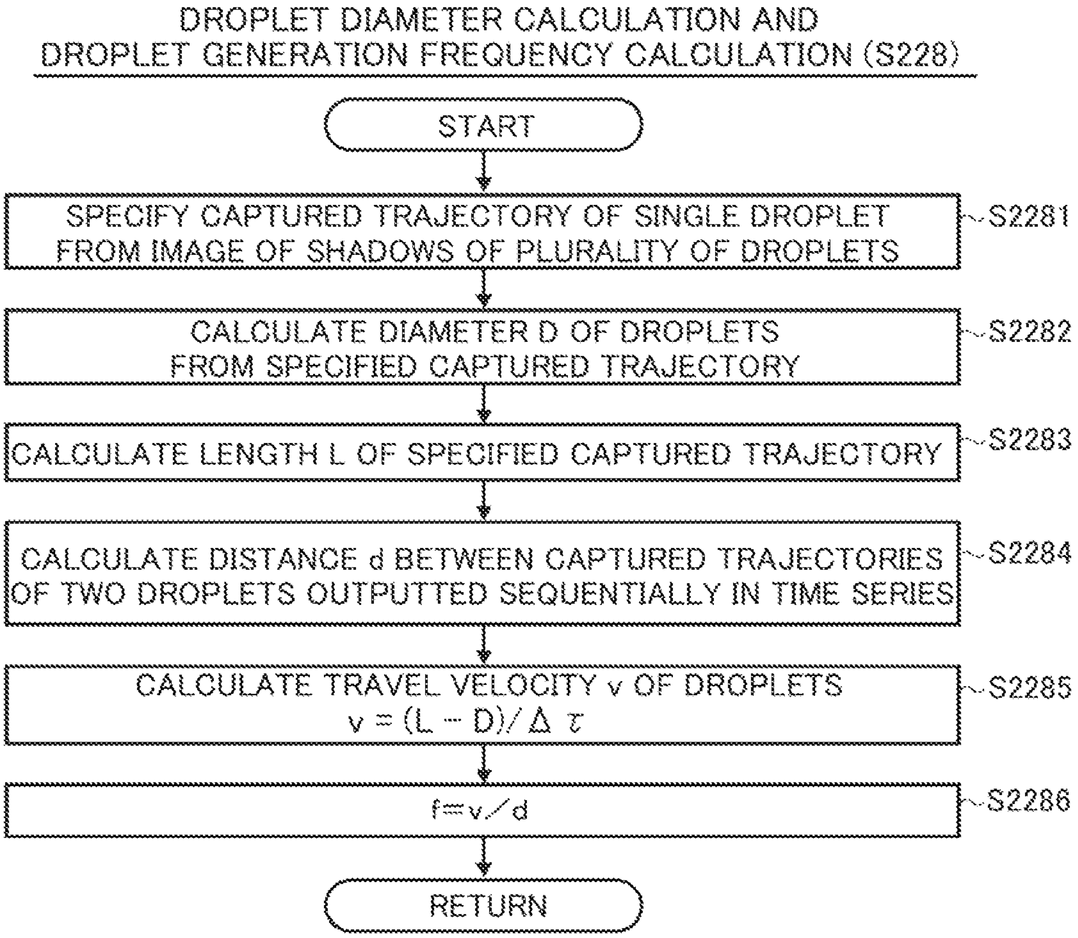
FIG. 12A is a flowchart illustrating a process for calculating the diameter of a droplet and a droplet generation frequency shown in FIG. 11.
FIG. 12B schematically illustrates an image of droplets captured by a droplet image measurement unit shown in FIG. 10.
Figure 12:
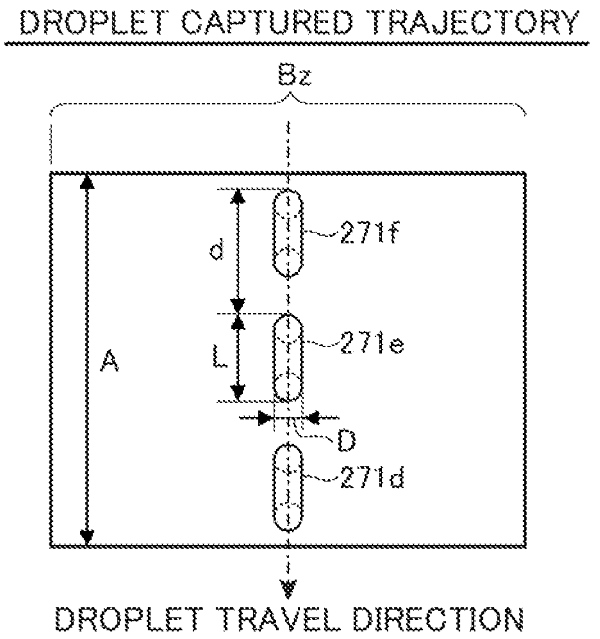

The operations performed by the remaining target amount measurement system provided in the EUV light generation apparatus 1 according to the second embodiment differ from the operations shown in FIGS. 7 and 8 and described in the first embodiment in terms of the droplet output calculation process and the process for calculating the diameter of the droplets, as shown in FIGS. 11 and 12. The other operations are the same as those described in the first embodiment.

Descriptions of operations identical to those in the first embodiment will be omitted.

The droplet output calculation process performed by the droplet output calculation control unit 43 will be described with reference to FIG. 11.

The droplet output calculation control unit 43 may perform the following process when the execution start signal for the droplet output calculation process, outputted in step S20 of FIG. 6, has been inputted.

In step S221, the droplet output calculation control unit 43 may reset the total output amount Vsum to 0.

In step S222, the droplet output calculation control unit 43 may reset the timer T and then start the timer T.

In step S223, the droplet output calculation control unit 43 may output, to the image sensor 412*a*, the shutter signal for opening the shutter of the image sensor 412*a* if it is time for the shutter to open.

The droplet output calculation control unit 43 may store the value of the timer T at the time when the shutter signal for opening the shutter is outputted.

In step S224, the droplet output calculation control unit 43 may output the illumination signal to the light source 411*a* of the droplet image measurement unit 41 for the predetermined illumination time $\Delta\tau$ if it is time for the light source 411*a* to emit light.

In step S225, when the predetermined image capturing time $\Delta t$ has elapsed, the droplet output calculation control unit 43 may output the shutter signal for closing the shutter of the image sensor 412*a* to the image sensor 412*a*.

The image capturing time $\Delta t$ may be an amount of time spanning from when the shutter of the image sensor 412*a* opens in step S223 to when the shutter closes in step S225.

The droplet output calculation control unit 43 may store the value of the timer T at the time when the shutter signal for closing the shutter is outputted.

In step S226, the droplet output calculation control unit 43 may obtain the image data of the shadow of the droplet 271 captured in step S225 from the image obtainment control unit 413.

In step S227, the droplet output calculation control unit 43 may determine whether or not the droplet 271 is present in the image data obtained in step S226.

In the case where the droplet 271 is present in the obtained image data, the droplet output calculation control unit 43 may advance the process to step S228. On the other hand, in the case where the droplet 271 is not present in the obtained image data, the droplet output calculation control unit 43 may advance the process to step S229.

In step S228, the droplet output calculation control unit 43 may calculate the diameter D of the droplets 271 present in the obtained image data and the generation frequency f of the droplets 271.

Note that the processes for calculating the diameter D of the droplets 271 and the generation frequency f of the droplets 271 will be described later with reference to FIG. 12A.

In step S229, the droplet output calculation control unit 43 may set the diameter D of the droplets 271 to 0 and the generation frequency f of the droplets 271 to 0.

In the case where the droplet 271 is not present in the image data obtained in step S226, the droplet output calculation control unit 43 can consider the diameter D of the droplets 271 to be 0 and the generation frequency f of the droplets 271 to be 0.

In step S230, the droplet output calculation control unit 43 may calculate the volume V of the droplets 271 based on the diameter D of the droplets 271 calculated in step S228 or step S229.

The droplet output calculation control unit 43 may calculate the volume V of the droplet 271 through the formula $V=(4/3)\Pi(D/2)^3$.

In step S231, the droplet output calculation control unit 43 may determine whether or not ΔT, which represents a difference between the value of the timer T stored in step S225 and the value of the timer T in step S230, is greater than the predetermined measurement interval K.

The droplet output calculation control unit 43 may stand by if ΔT is not greater than the measurement interval K. On the other hand, the droplet output calculation control unit 43 may advance the process to step S232 if ΔT is greater than the measurement interval K.

In step S232, the droplet output calculation control unit 43 may reset the timer T and then start the timer T.

In step S233, the droplet output calculation control unit 43 may calculate the number N of the droplets 271 based on the generation frequency f of the droplets 271 calculated in step S228 and the measurement interval K.

The droplet output calculation control unit 43 may take a value K·f, obtained by multiplying the generation frequency f of the droplets 271 by the measurement interval K, as the number N of the droplets 271.

In step S234, the droplet output calculation control unit 43 may update the total output amount Vsum based on the volume V of the droplets 271 calculated in step S230 and the number N of the droplets 271 calculated in step S233.

The droplet output calculation control unit 43 may update the total output amount Vsum by adding a value V·N, in which the volume V of the droplets 271 is multiplied by the number N of the droplets 271, to the total output amount Vsum.

In step S235, the droplet output calculation control unit 43 may determine whether or not the droplet output calculation process execution stop signal, outputted from the target generation control unit 74, has been inputted.

The droplet output calculation control unit 43 may stop calculating the total output amount Vsum of the droplets 271 if the execution stop signal is inputted. On the other hand, the droplet output calculation control unit 43 may return the process to step S223 if the execution stop signal is not inputted.

The processes through which the droplet output calculation control unit 43 calculates the diameter D of the droplets 271 and the generation frequency f of the droplets 271 will be described with reference to FIGS. 12A and 12B.

In the second embodiment, the illumination time Δτ may be approximately the same as or shorter than the generation cycle of the droplets 271. Accordingly, in the second embodiment, it is possible for the image of the shadow of a single droplet 271 to be captured as a plurality of linked images in the image data obtained in a single instance of image capturing, as shown in FIG. 12B. The plurality of linked images of the shadow of a single droplet 271 are also referred to as a “shadow image trajectory” of the single droplet 271.

The diameter D of the droplets 271 and the generation frequency f of the droplets 271 may be calculated through the processes described hereinafter.

In step S2281, the droplet output calculation control unit 43 may specify the shadow image trajectory of a single droplet 271 from the images of the shadows of a plurality of droplets 271 present in the image data obtained in step S226 of FIG. 11. The shadow image trajectory of the single droplet 271 can correspond to a shadow image trajectory 271*e* shown in FIG. 12B, for example.

In step S2282, the droplet output calculation control unit 43 may calculate the diameter D of the droplet 271 from the shadow image trajectory specified in step S2281.

The droplet output calculation control unit 43 may take a width of the shadow image trajectory in the direction orthogonal to the travel direction of the droplets 271 as the diameter D of the droplet 271.

In step S2283, the droplet output calculation control unit 43 may calculate a length L of the shadow image trajectory specified in step S2281.

The length L of the shadow image trajectory may be a length of the shadow image trajectory in the travel direction of the droplets 271.

In step S2284, the droplet output calculation control unit 43 may calculate a distance d between the shadow image trajectories of two adjacent droplets 271 that have been outputted sequentially.

In terms of the example shown in FIG. 12B, the distance d between the shadow image trajectory 271*e* specified in step S2281 and a shadow image trajectory 271*f* adjacent thereto may be calculated.

The distance d between the shadow image trajectories may be a distance, in the travel direction of the droplets 271, between the shadow image trajectories of two adjacent droplets 271 that have been outputted sequentially.

In step S2285, the droplet output calculation control unit 43 may calculate the travel velocity v of the droplets 271 based on the diameter D calculated in step S2282 and the length L calculated in step S2283.

The droplet output calculation control unit 43 may calculate the travel velocity v of the droplets 271 using the following formula.

$$v=(L-D)/\Delta\tau$$

The right side of the above formula (L−D) can indicate a distance traveled by a single droplet 271 during the illumination time Δτ.

In step S2286, the droplet output calculation control unit 43 may calculate the generation frequency f of the droplets 271 based on the distance d calculated in step S2284 and the travel velocity v calculated in step S2285.

The droplet output calculation control unit 43 may calculate the generation frequency f of the droplets 271 using the following formula.

$$f=v/d$$

Note that the image capturing time Δt can fulfill the following formula in the second embodiment as well, in the same manner as in the first embodiment.

$$(d-A)/v<\Delta t<d/v$$

Accordingly, the image sensor 412*a* that partially configures the image capturing unit 412 can capture images of the shadow image trajectories of two adjacent droplets 271 that have been outputted sequentially without the shadow image trajectories overlapping with one another, in the second embodiment as well.

6.3 Effect

According to the second embodiment, the diameter D and the generation frequency f of the droplets 271 can be calculated, and the total output amount Vsum can be calculated as well, without the droplet counter unit 42 being provided.

Therefore, according to the second embodiment, the entire droplet counter unit 42 can be omitted, and thus the remaining target amount measurement system provided in the EUV light generation apparatus 1 can be further simplified.

6.4 Variation on Second Embodiment

The configuration of a remaining target amount measurement system provided in the EUV light generation apparatus 1 according to a variation on the second embodiment will be described with reference to FIG. 13.

The configuration of the remaining target amount measurement system provided in the EUV light generation apparatus 1 according to the variation on the second embodiment is the same as that shown in FIG. 10 and described in the second embodiment.

Figure 13:
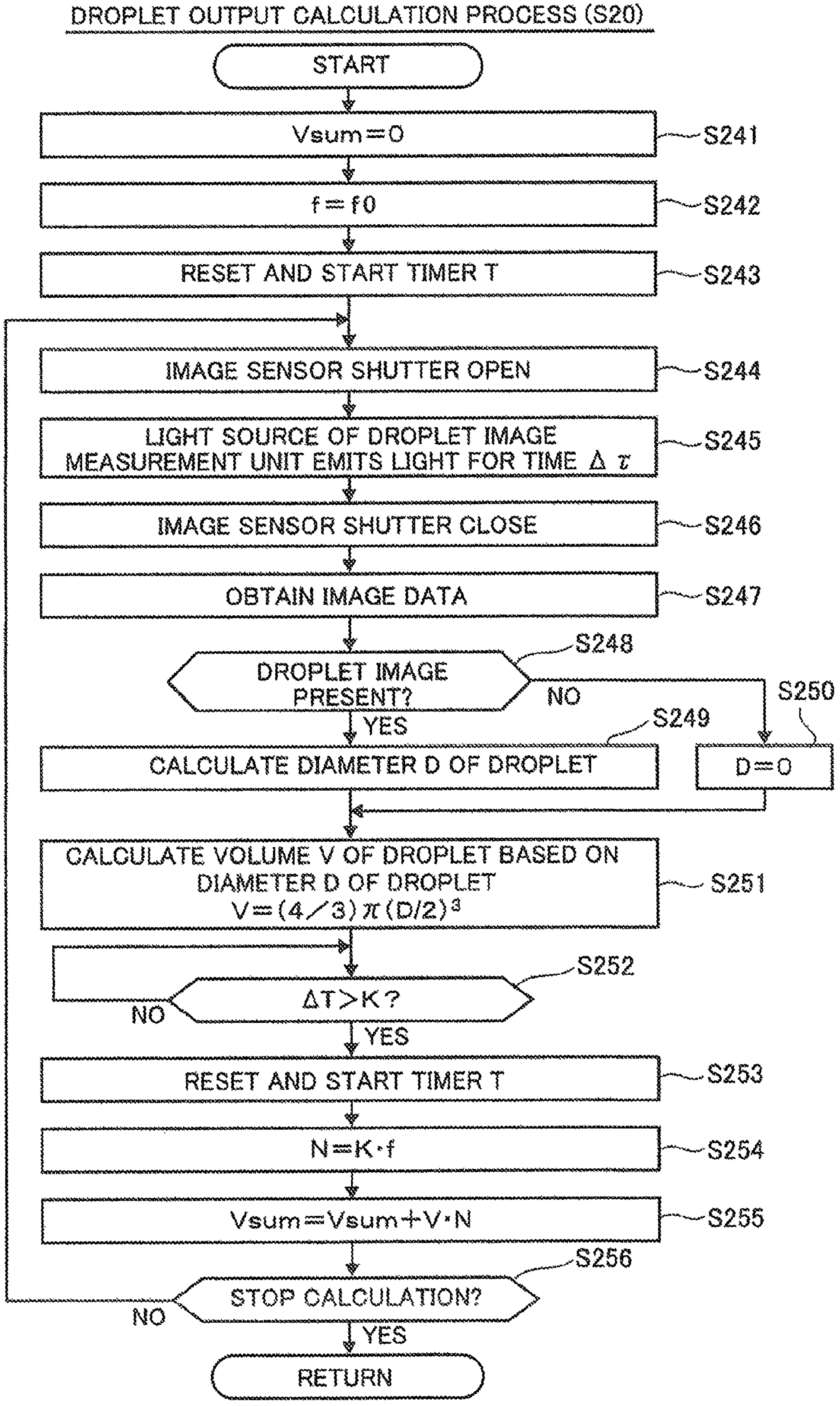
FIG. 13 is a flowchart illustrating a process performed by a droplet output calculation control unit provided in an EUV light generation apparatus according to a variation on the second embodiment.

However, operations performed by the remaining target amount measurement system provided in the EUV light generation apparatus 1 according to the variation on the second embodiment differ from those shown in FIG. 11 and described in the second embodiment in terms of the droplet output calculation process shown in FIG. 13. The other operations are the same as those in the second embodiment.

Descriptions of configurations and operations identical to those in the second embodiment will be omitted.

In the second embodiment, the generation frequency f of the droplets 271 may be calculated from the distance d between the shadow image trajectories of two adjacent droplets 271 that have been outputted sequentially and the travel velocity v of the droplets 271.

According to the variation on the second embodiment, the generation frequency f of the droplets 271 may be a fixed value.

The droplet output calculation process performed by the droplet output calculation control unit 43 will be described with reference to FIG. 13.

The droplet output calculation control unit 43 may perform the following process when the execution start signal for the droplet output calculation process, outputted in step S20 of FIG. 6, has been inputted.

In step S241, the droplet output calculation control unit 43 may carry out the same process as that indicated in step S221 of FIG. 11.

In step S242, the droplet output calculation control unit 43 may set the generation frequency f of the droplets 271 to f0.

The generation frequency f0 may be a predetermined fixed value for the generation frequency f. The generation frequency f0 may, for example, be inputted into the target generation control unit 74 through operations performed by the operator, or may be inputted via the EUV light generation controller 5, a network, or the like.

In step S243 to step S248, the droplet output calculation control unit 43 may carry out the same processes as those indicated in step S222 to step S227 of FIG. 11.

In step S249, the droplet output calculation control unit 43 may calculate the diameter D of the droplets 271 present in the obtained image data.

Note that the process for calculating the diameter D of the droplets 271 may be the same as that indicated in step S2281 and step S2282 of FIG. 12A.

In step S250, the droplet output calculation control unit 43 may set the diameter D of the droplets 271 to 0.

In the case where the droplet 271 is not present in the image data obtained in step S247, the droplet output calculation control unit 43 can consider the diameter D of the droplet 271 to be 0.

In step S251 to step S256, the droplet output calculation control unit 43 may carry out the same processes as those indicated in step S230 to step S235 of FIG. 11.

7. Remaining Target Amount Measurement System Provided in EUV Light Generation Apparatus According to Third Embodiment 7.1 Configuration The configuration of a remaining target amount measurement system provided in the EUV light generation apparatus 1 according to a third embodiment will be described with reference to FIG. 14.

Figure 14:
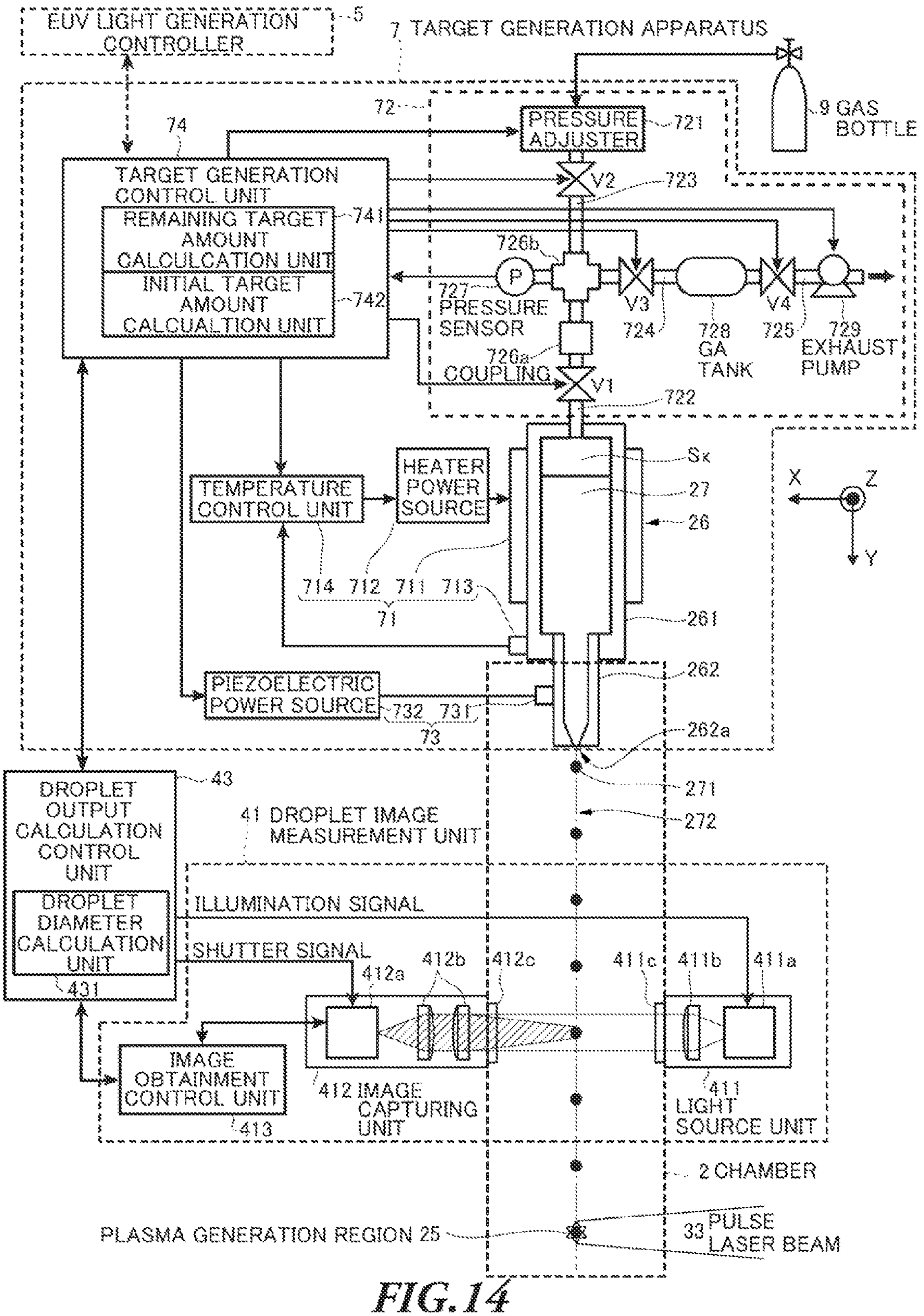
FIG. 14 is a diagram illustrating the configuration of a remaining target amount measurement system provided in an EUV light generation apparatus according to a third embodiment.

The configuration of the remaining target amount measurement system provided in the EUV light generation apparatus 1 according to the third embodiment differs from the configuration shown in FIG. 10 and described in the second embodiment in terms of the configurations of the pressure adjustment mechanism 72 and the target generation control unit 74, as shown in FIG. 14. The other configurations are the same as those described in the second embodiment.

Descriptions of configurations identical to those in the second embodiment will be omitted.

In the first embodiment, the initial amount V0 in the remaining target amount management process (step S10 in FIG. 6) may employ the remaining amount Vres calculated and stored in the previous remaining target amount management process.

In the second embodiment, the initial amount V0 in the remaining target amount management process may be the same as that described in the first embodiment.

In the third embodiment, the initial amount V0 in the remaining target amount management process may be actually measured using the pressure adjustment mechanism 72 before calculating the remaining amount Vres of the target 27.

The pressure adjustment mechanism 72 according to the third embodiment and shown in FIG. 14 may include the pressure adjuster 721, pipes 722 to 725, a coupling 726*a* and a coupling 726*b*, a pressure sensor 727, a gas tank 728, an exhaust pump 729, and valves V1 to V4.

The pressure adjuster 721 and the pipe 722 may have the same configurations as those shown in FIG. 10 and described in the second embodiment.

The pipe 723 may connect the pressure adjuster 721 to the pipe 722 via the coupling 726*a*.

The pipe 724 may connect the pressure sensor 727 to the gas tank 728.

The pipe 725 may connect the gas tank 728 to the exhaust pump 729.

The pipe 723 located between the coupling 726*a* and the pressure adjuster 721 may be connected to the pipe 724 located between the pressure sensor 727 and the gas tank 728 via the coupling 726*b*.

The interiors of the tank 261 of the target supply device 26, the pressure adjuster 721, the pressure sensor 727, the gas tank 728, and the exhaust pump 729 may communicate with one another via the pipes 722 to 725.

The pipes 722 to 725 may be covered with insulation or the like (not shown). A heater (not shown) may be disposed on the pipes 722 to 725. A temperature within the pipes 722 to 725 may be held at the same temperature as the temperature in the tank 261 of the target supply device 26.

The pressure sensor 727 may detect a pressure in the various constituent elements of the pressure adjustment mechanism 72, including the pipes 722 to 725, and in a space Sx in the tank 261.

The space Sx in the tank 261 may be a space, in the overall space in the tank 261 in which the target 27 can be held, that is not occupied by the target 27.

The pressure sensor 727 may be connected to the target generation control unit 74. The pressure sensor 727 may output a detection signal indicating the detected pressure to the target generation control unit 74.

The gas tank 728 may include an inner space of a predetermined volume.

An outer circumferential area of the gas tank 728 may be covered with insulation or the like (not shown). A heater (not shown) may be provided on the outer circumferential area of the gas tank 728. A temperature within the gas tank 728 may be held at the same temperature as the temperature in the tank 261 of the target supply device 26.

The exhaust pump 729 may exhaust a gas from the various constituent elements of the pressure adjustment mechanism 72, including the pipes 722 to 725, and from the space Sx in the tank 261. The exhaust pump 729 may be connected to the target generation control unit 74.

The valve V1 may be provided in the pipe 722 between the coupling **726*a* and the tank 261**.

The valve V2 may be provided in the pipe 723 between the coupling **726*b* and the pressure adjuster 721**.

The valve V3 may be provided in the pipe 724 between the coupling **726*b* and the gas tank 728**.

The valve V4 may be provided in the pipe 725 between the gas tank 728 and the exhaust pump 729.

The valves V1 to V4 may regulate the flow of gas within the pipes 722 to 725 by opening and closing.

The valves V1 to V4 may be solenoid valves. The valves V1 to V4 may each be connected to the target generation control unit 74.

The target generation control unit 74 may control exhaust operations performed by the exhaust pump 729 by outputting an operation signal or an operation stop signal to the exhaust pump 729.

The target generation control unit 74 may control opening/closing operations of the valves V1 to V4 by outputting a valve open signal or a valve close signal to the valves V1 to V4, respectively.

The target generation control unit 74 may include an initial target amount calculation unit 742. The initial target amount calculation unit 742 may be a program that calculates the initial amount V0 of the target 27 held in the tank 261.

The target generation control unit 74 may calculate the initial amount V0 of the target 27 held in the tank 261 using the initial target amount calculation unit 742, based on the volume and pressure in the constituent elements of the pressure adjustment mechanism 72, the space Sx in the tank 261, and so on. The target generation control unit 74 may store the calculated initial amount V0 of the target 27. The target generation control unit 74 may further store the initial amount V0 of the target 27 in association with a time at which the initial amount V0 was calculated.

7.2 Operation

Operations performed by the remaining target amount measurement system provided in the EUV light generation apparatus 1 according to the third embodiment will be described with reference to FIGS. 14 to 16.

Figure 15:
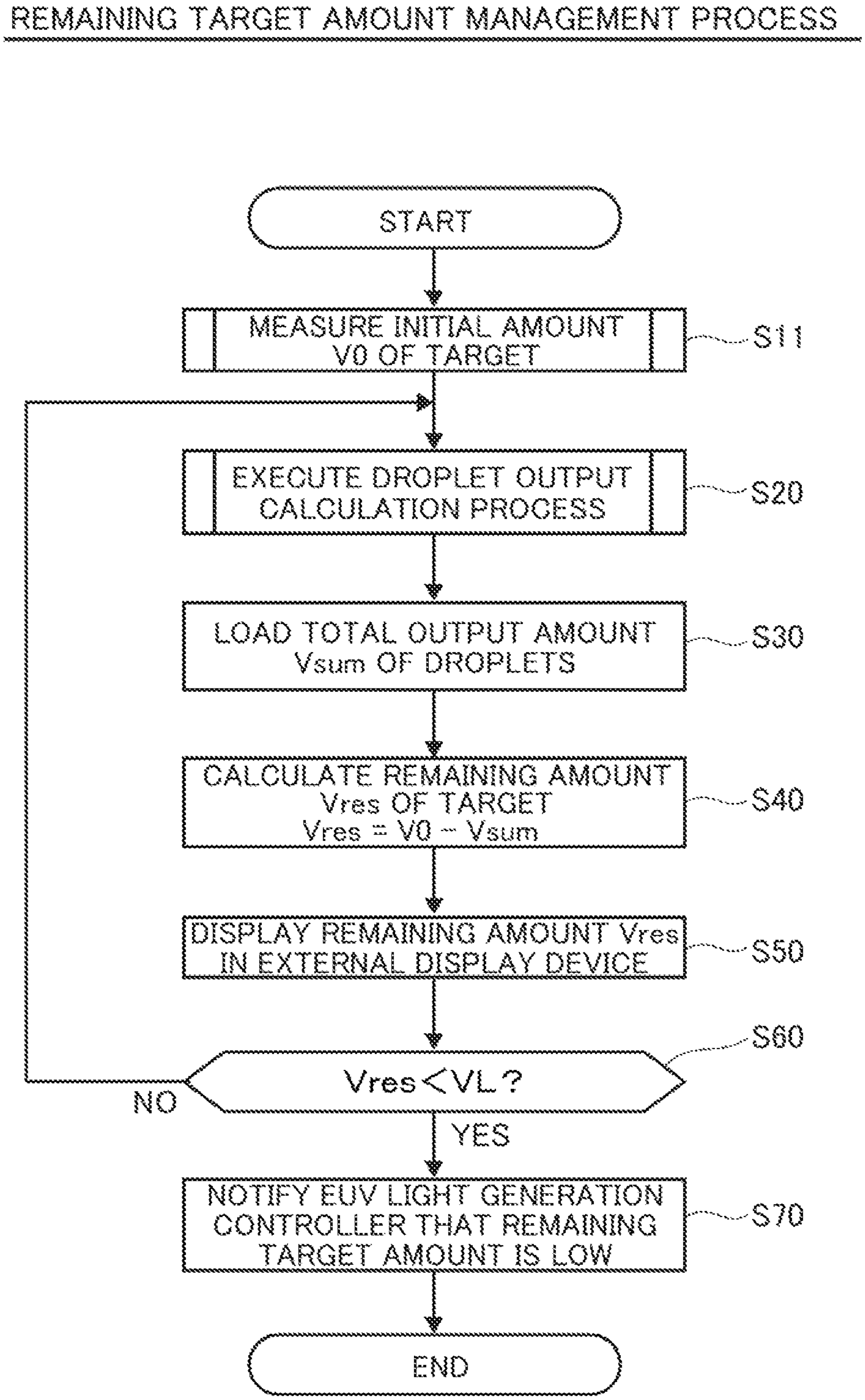
FIG. 15 is a flowchart illustrating a process performed by a target generation control unit shown in FIG. 14.
Figure 16:
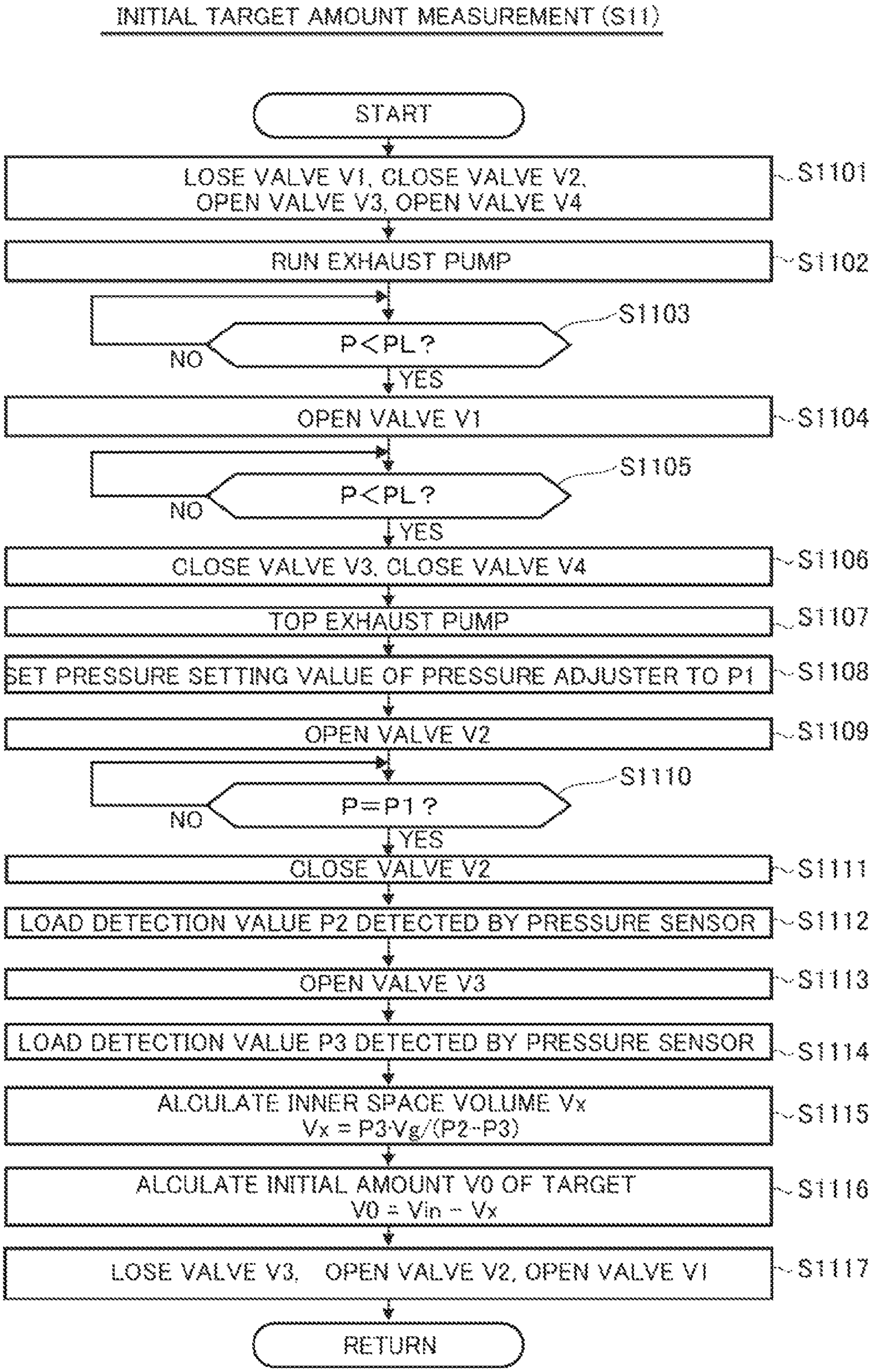
FIG. 16 is a flowchart illustrating a process for measuring an initial amount of a target shown in FIG. 15.

The operations performed by the remaining target amount measurement system provided in the EUV light generation apparatus 1 according to the third embodiment differ from the operations described in the second embodiment in terms of the remaining target amount management process and a process for measuring an initial target amount, as shown in FIGS. 15 and 16. The other operations are the same as those in the second embodiment.

Descriptions of operations identical to those in the second embodiment will be omitted.

A process performed by the target generation control unit 74 for managing a remaining target amount will be described with reference to FIG. 15.

The target generation control unit 74 may carry out the following process upon the input of a control signal for measuring a remaining target amount, outputted from the EUV light generation controller 5.

In step S11, the target generation control unit 74 may execute a process for measuring the initial amount V0 of the target 27 held in the tank 261.

Note that the process for measuring the initial amount V0 of the target 27 will be described later with reference to FIG. 16.

In step S20, the target generation control unit 74 may output an execution start signal for a droplet output calculation process to the droplet output calculation control unit 43.

The droplet output calculation control unit 43 into which the execution start signal has been inputted can execute the droplet output calculation process.

The droplet output calculation process according to the third embodiment may be the same as the droplet output calculation process according to the second embodiment (FIG. 11) or the droplet output calculation process according to the variation on the second embodiment (FIG. 13).

In step S30, the target generation control unit 74 may load the total output amount Vsum of the droplets 271 calculated in step S20.

In step S40, the target generation control unit 74 may calculate the remaining amount Vres of the target 27 held in the tank 261.

The target generation control unit 74 may calculate the remaining amount Vres by subtracting the total output amount Vsum loaded in step S30 from the initial amount V0 measured in step S11.

In step S50, the target generation control unit 74 may display the remaining amount Vres of the target 27 calculated in step S40 in an external display device.

In step S60, the target generation control unit 74 may determine whether or not the remaining amount Vres of the target 27 calculated in step S40 is lower than VL.

As described with reference to FIG. 6, VL may be a lower limit amount for the remaining amount Vres of the target 27 held in the tank 261.

The target generation control unit 74 may return the process to step S20 when the remaining amount Vres is not lower than the lower limit amount VL. On the other hand, the target generation control unit 74 may advance the process to step S70 when the remaining amount Vres is lower than the lower limit amount VL.

In step S70, the target generation control unit 74 may notify the EUV light generation controller 5 that the remaining amount Vres of the target 27 held in the tank 261 is low. At the same time, the target generation control unit 74 may display an indication that the remaining amount Vres of the target 27 held in the tank 261 is low in the external display device.

A process performed by the target generation control unit 74 for measuring the initial amount V0 of the target 27 will be described with reference to FIG. 16.

In step S1101, the target generation control unit 74 may output the close signals to the valve V1 and the valve V2, and may close the valve V1 and the valve V2. In addition, the target generation control unit 74 may output the open signals to the valve V3 and the valve V4, and may open the valve V3 and the valve V4.

Aside from the area of the pipe 722 between the tank 261 and the valve V1 and the area of the pipe 723 between the pressure adjuster 721 and the valve V2, the pipes 722 to 725, the pressure sensor 727, and the gas tank 728 can communicate with the exhaust pump 729.

In step S1102, the target generation control unit 74 may output the operation signal to the exhaust pump 729 and cause the exhaust pump 729 to carry out exhaust operations.

A space in the pipes 722 to 725 aside from the area of the pipe 722 between the tank 261 and the valve V1 and the area of the pipe 723 between the pressure adjuster 721 and the valve V2, and a space in the gas tank 728, are also collectively referred to as a "space S1".

A gas within the space S1 can be exhausted as a result of the exhaust operations performed by the exhaust pump 729.

In step S1103, the target generation control unit 74 may determine whether or not a detection value P detected by the pressure sensor 727 is less than PL.

PL may be a pressure value that is close to a vacuum state. PL may be approximately 1 hPa, for example.

The target generation control unit 74 may stand by if the detection value P detected by the pressure sensor 727 is not less than PL. On the other hand, the target generation control unit 74 may advance the process to step S1104 if the detection value P detected by the pressure sensor 727 is less than PL.

The pressure in the space S1 from which the gas has been exhausted in step S1102 can decrease to a pressure that is close to a vacuum state.

In step S1104, the target generation control unit 74 may output the open signal to the valve V1, and may open the valve V1.

A space in the pipe 722 between the tank 261 and the valve V1 and the space Sx in the tank 261 are also collectively called a "space S2".

A gas in the space S2 can be exhausted via the space S1 due to a pressure difference between the pressure in the space S1 reduced in step S1103 and the pressure in the space S2.

In step S1105, the target generation control unit 74 may determine whether or not the detection value P detected by the pressure sensor 727 is less than PL.

The target generation control unit 74 may stand by if the detection value P detected by the pressure sensor 727 is not less than PL. On the other hand, the target generation control unit 74 may advance the process to step S1106 if the detection value P detected by the pressure sensor 727 is less than PL.

The pressure in the space S1 and the space S2 exhausted in step S1104 can decrease to a pressure that is close to a vacuum state.

In step S1106, the target generation control unit 74 may output the close signal to the valve V3, and may close the valve V3.

A space in the pipe 722 between the coupling 726*a* and the valve V1, a space in the pipe 723 between the coupling 726*a* and the valve V2, and a space in the pipe 724 between the pressure sensor 727 and the valve V3 are also collectively referred to as a "space S3".

By closing the valve V3, the space S2 and the space S3 can be sealed at a pressure that is close to a vacuum state.

Furthermore, the target generation control unit 74 may output a close signal to the valve V4, and may close the valve V4.

A space in the pipe 724 between the gas tank 728 and the valve V3 and a space in the gas tank 728 are also collectively called a "space S4".

By closing the valve V4, the space S4 can be sealed at the pressure that is close to a vacuum state.

In step S1107, the target generation control unit 74 may output the operation stop signal to the exhaust pump 729 and cause the exhaust pump 729 to stop the exhaust operations.

In step S1108, the target generation control unit 74 may set a pressure setting value P1 in the pressure adjuster 721. The pressure adjuster 721 can supply the inert gas from the gas bottle 9 at a pressure corresponding to the pressure setting value P1.

The pressure setting value P1 may be a pressure value that is significantly greater than PL. P1 may be approximately 1013 hPa, for example.

In step S1109, the target generation control unit 74 may output the open signal to the valve V2, and may open the valve V2.

The area of the pipe 723 between the pressure adjuster 721 and the valve V2 and the pressure adjuster 721 can communicate with the space S2 and the space S3 sealed in step S1106.

As a result, the pressure adjuster 721 can supply the inert gas to the space S2 and the space S3 until the pressure in the space S2 and the space S3 reaches the pressure value P1.

In step S1110, the target generation control unit 74 may determine whether or not the detection value P detected by the pressure sensor 727 is equal to the pressure value P1 of the inert gas supplied in step S1109.

The target generation control unit 74 may stand by if the detection value P detected by the pressure sensor 727 is not equal to the pressure value P1 of the inert gas. On the other hand, the target generation control unit 74 may advance the process to step S1111 if the detection value P detected by the pressure sensor 727 is equal to the pressure value P1 of the inert gas.

The pressure in the space S2 and the space S3 that have communicated with the pressure adjuster 721 in step S1109 can increase to the pressure value P1 of the inert gas set in the pressure adjuster 721 in step S1108.

In step S1111, the target generation control unit 74 may output the close signal to the valve V2, and may close the valve V2.

The space S2 and the space S3 pressurized in step S1110 can be sealed at the pressure value P1.

In step S1112, the target generation control unit 74 may load the detection value P detected by the pressure sensor 727 and may store the loaded detection value P as P2.

The pressure in the space S2 and the space S3 sealed in step S1111 can be stored as the pressure value P2.

In step S1113, the target generation control unit 74 may output the open signal to the valve V3, and may open the valve V3.

The space S2 and the space S3 sealed in step S1111 can communicate with the space S4 sealed in step S1106.

The inert gas can flow from the space S2 and the space S3 sealed in step S1111 into the space S4 sealed in step S1106 due to the pressure difference therebetween. The pressure in the space S2 and the space S3 and the pressure in the space S4 can reach a state of equilibrium at a pressure that is lower than the pressure value P2.

In step S1114, the target generation control unit 74 may load the detection value P detected by the pressure sensor 727 and may store the loaded detection value P as P3.

The pressure in the spaces S2 to S4 that have communicated in step S1113 can be stored as the pressure value P3.

In step S1115, the target generation control unit 74 may calculate a volume Vx of the space S2 and the space S3.

The target generation control unit 74 may calculate the volume Vx of the space S2 and the space S3 through the following formula.

$$Vx=P3-Vg/(P2-P3)$$

Vg may be a volume of the space S4. P2 and P3 may be the pressure values loaded in step S1112 and step S1114, respectively.

Note that the target generation control unit 74 may calculate Vx from an adiabatic expansion formula (where $PV\gamma$ is constant).

In step S1116, the target generation control unit 74 may calculate the initial amount V0 of the target 27 based on the volume Vx calculated in step S1115 and a predetermined value Vin.

The predetermined value Vin indicates the volume of the space within the pipe 722 between the tank 261 and the valve V1, the entire holding space within the tank 261, and the space S3. Vin may be calculated in advance.

The target generation control unit 74 may calculate the initial amount V0 through the following formula.

$$V0=Vin-Vx$$

The right side of the formula (Vin−Vx) can be equivalent to the remaining amount Vres calculated in the previous remaining target amount management process.

In step S1117, the target generation control unit 74 may output the close signal to the valve V3, and may close the valve V3.

The communication between the spaces S2 and S3 and the space S4 can be cut off, and the flow of the inert gas to the gas tank 728 can be cut off.

Furthermore, the target generation control unit 74 may output the open signals to the valve V1 and the valve V2, and may open the valve V1 and the valve V2.

The pressure adjuster 721 can communicate with the space S2 and the space S3.

In the case where the target 27 is to be supplied to the interior of the chamber 2 after the aforementioned processing, a pressure value may be set in the pressure adjuster 721. Through this, the target 27 held in the tank 261 can be pressurized to the set pressure. The pressurized target 27 can then be supplied into the chamber 2 via the nozzle 262.

7.3 Effect

According to the third embodiment, the remaining amount Vres of the target 27 can be calculated (step S40 in FIG. 15) using a value obtained by actually measuring the initial amount V0 of the target 27.

Therefore, according to the third embodiment, the remaining amount Vres of the target 27 can be measured more accurately than in the first embodiment and the second embodiment.

8. Other

8.1 Hardware Environment for Control Units

It will be clear to one skilled in the art that the subject matter described herein can be carried out by combining program modules or software applications with a generic computer or a programmable controller. Generally speaking, a program module includes routines, programs, components, data structures, and so on through which the processes described in the present disclosure can be executed.

Figure 17:
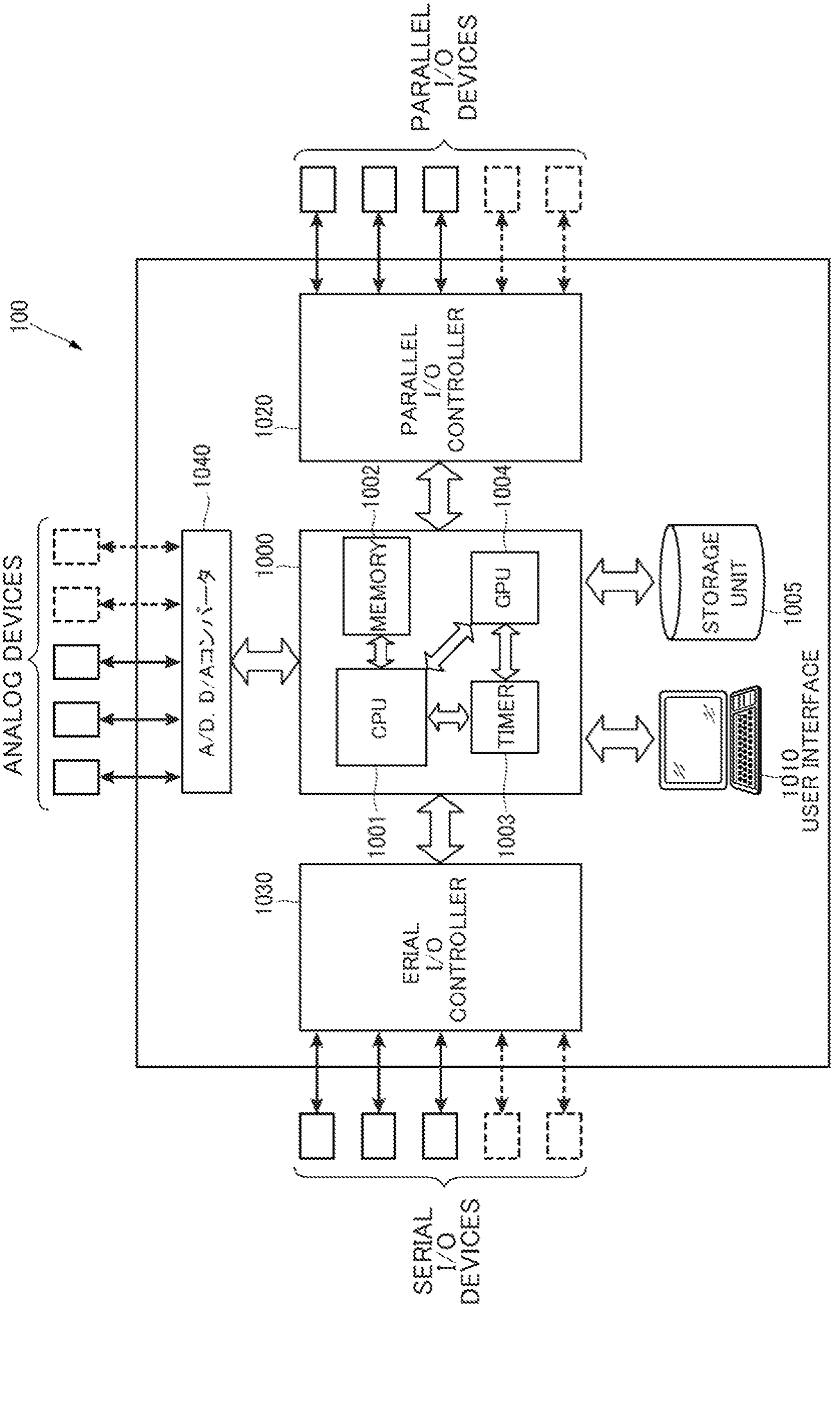
FIG. 17 is a block diagram illustrating a hardware environment for control units.

FIG. 17 is a block diagram illustrating an exemplary hardware environment under which various aspects of the subject matter disclosed here can be executed. An exemplary hardware environment 100 shown in FIG. 17 may include a processing unit 1000, a storage unit 1005, a user interface 1010, a parallel I/O controller 1020, a serial I/O controller 1030, and an A/D and D/A converter 1040; however, the configuration of the hardware environment 100 is not limited thereto.

The processing unit 1000 may include a central processing unit (CPU) 1001, a memory 1002, a timer 1003, and a graphics processing unit (GPU) 1004. The memory 1002 may include a random access memory (RAM) and a read-only memory (ROM). The CPU 1001 may be any commercially-available processor. A dual microprocessor, another multiprocessor architecture, or the like may be used as the CPU 1001.

The constituent elements shown in FIG. 17 may be connected to one another in order to execute the processes described in the present disclosure.

In operations, the processing unit 1000 may load a program stored in the storage unit 1005 and execute the program, or the processing unit 1000 may load data along with a program from the storage unit 1005, or the processing unit 1000 may write data into the storage unit 1005. The CPU 1001 may execute the program loaded from the storage unit 1005. The memory 1002 may be a work area that temporarily holds programs executed by the CPU 1001 and data used by the CPU 1001 to carryout operations. The timer 1003 may measure an interval of time and output results of that measurement to the CPU 1001 in accordance with the execution of programs. The GPU 1004 may process graphical data in accordance with a program loaded from the storage unit 1005 and may output results of that processing to the CPU 1001.

The parallel I/O controller 1020 may be connected to parallel I/O devices capable of communicating with the processing unit 1000, such as the EUV light generation controller 5, the laser beam direction control unit 34, the target generation control unit 74, the temperature control unit 714, the droplet output calculation control unit 43, the image sensor 412*a*, the image obtainment control unit 413, and so on, and may control communication between the processing unit 1000 and those parallel I/O devices. The serial I/O controller 1030 may be connected to serial I/O devices capable of communicating with the processing unit 1000, such as the heater power source 712, the piezoelectric power source 732, the pressure adjuster 721, the counter circuit 423, the light source 411*a*, the light source 421*a*, the DC voltage power source 734, the pulse voltage power source 736, the exhaust pump 729, and so on, and may control communication between the processing unit 1000 and those serial I/O devices. The A/D and D/A converter 1040 may be connected via an analog port to analog devices such as various types of sensors including temperature sensors, pressure sensors, vacuum indicators, and so on, the target sensor 4, the photodetector 422*a*, the liquid surface level sensor 8, and so on, and may control communication between the processing unit 1000 and those analog devices, convert communicated content from analog to digital and digital to analog, and so on.

The user interface 1010 may display the progress of programs executed by the processing unit 1000 to an operator so that the operator can instruct the processing unit 1000 to stop the programs, execute interruption routines, and so on.

The exemplary hardware environment 100 may be applied to the configurations of the EUV light generation controller 5, the laser beam direction control unit 34, the target generation control unit 74, the temperature control unit 714, the droplet output calculation control unit 43, and the image obtainment control unit 413 described in the present disclosure. It will be clear to one skilled in the art that such controllers may be realized in a distributed computing environment, or in other words, in an environment where tasks are executed by processing units connected over a communication network. In the present disclosure, the EUV light generation controller 5, the laser beam direction control unit 34, the target generation control unit 74, the temperature control unit 714, the droplet output calculation control unit 43, and the image obtainment control unit 413 may be connected to one another via a communication network such as Ethernet, the Internet, or the like. In such a distributed computing environment, the program modules may be saved in both local and remote memory storage devices.

8.2 Electric Circuitry of Photodetector

Figure 18:
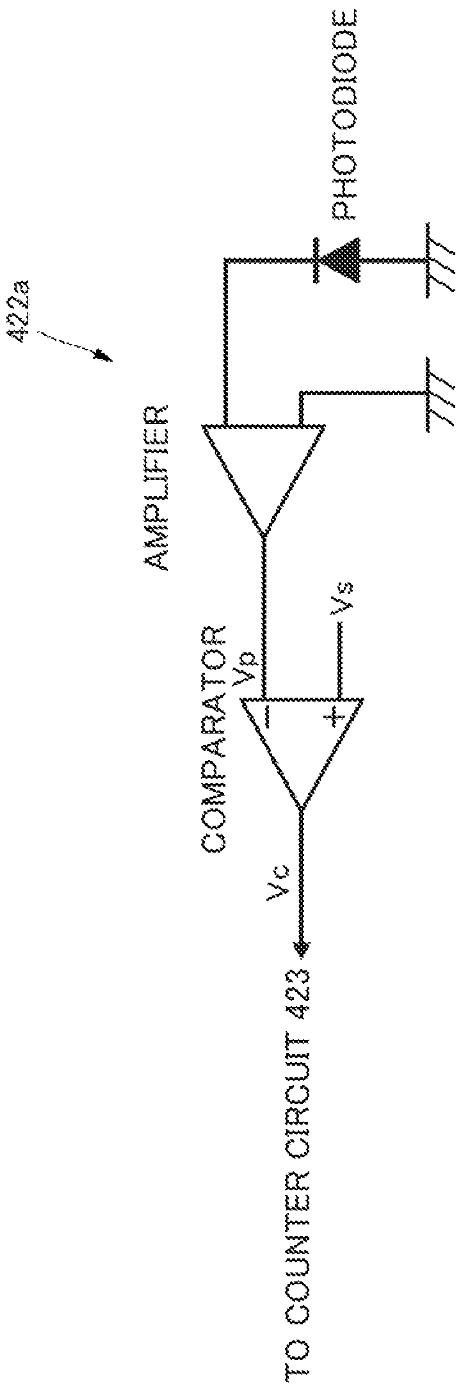
FIG. 18 is a circuit diagram of a photodetector.

The photodetector 422*a* included in the light-receiving unit 422 of the droplet counter unit 42 may be configured of electric circuitry such as that shown in FIG. 18.

The photodetector 422*a* may be a circuit that combines a photodiode, an amplifier, and a comparator.

In the case where the droplet 271 has been irradiated with the continuous laser beam emitted from the light source unit 421, the amount of light received by the photodiode can, due to the presence of the shadow of the droplet 271, drop below an amount of light received when only the continuous laser beam is present. Accordingly, an output signal Vp outputted from the amplifier after photoelectric conversion performed by the photodiode may be lower than a reference potential Vs.

On the other hand, when the droplet 271 is not being irradiated with the continuous laser beam emitted from the light source unit 421, the output signal Vp outputted from the amplifier after photoelectric conversion performed by the photodiode may be higher than the reference potential Vs.

A detection signal Vc outputted from the comparator can have a low-level potential V1 when the output signal Vp is at a higher potential than the reference potential Vs.

The detection signal Vc outputted from the comparator can have a high-level potential Vh when the output signal Vp is at a lower potential than the reference potential Vs.

The counter circuit 423 connected to the comparator can count the number N of the droplets 271 by assuming that a droplet 271 has been outputted when the high-level potential Vh is detected.

8.3 Other Variations

The droplet image measurement unit 41 may cause the continuous laser beam to be outputted from the light source 411*a* when the image capturing time $\Delta t$ of the image sensor 412*a* is approximately the same as the illumination time $\Delta\tau$ of the light source 411*a*.

The droplet image measurement unit 41 need not have the light source unit 411 and the image capturing unit 412 opposing each other with the target travel path 272 therebetween. For example, the light source unit 411 and the image capturing unit 412 may be disposed so that the window 411*c* and the window 412*c* thereof, respectively, face the same direction. The image capturing unit 412 can then capture light reflected by the droplets 271 rather than the shadows of the droplets 271. The window 411*c* of the light source unit 411 and the window 412*c* of the image capturing unit 412 may be disposed in any manner as long as light reflected from the droplets 271 can be captured.

The droplet counter unit 42 need not have the light source unit 421 and the light-receiving unit 422 opposing each other with the target travel path 272 therebetween. For example, the light source unit 421 and the light-receiving unit 422 may be disposed so that the window 421*c* and the window 422*c* thereof, respectively, face the same direction. The light-receiving unit 422 can detect light reflected by the droplets 271. The window 421*c* of the light source unit 421 and the window 422*c* of the light-receiving unit 422 may be disposed in any manner as long as light reflected from the droplets 271 can be detected.

The shutter signal that controls the opening/closing of the shutter in the image sensor 412*a* may be outputted by the image obtainment control unit 413 rather than the droplet output calculation control unit 43.

The droplet output calculation process (FIG. 7, FIG. 11, FIG. 13) need not be executed as a part of the process within the remaining target amount management process (FIG. 6, FIG. 15). The droplet output calculation control unit 43 may execute the droplet output calculation process autonomously, rather than in response to the execution start signal from the target generation control unit 74.

The EUV light generation controller 5, the target generation control unit 74, the temperature control unit 714, the droplet output calculation control unit 43, and the image obtainment control unit 413 may be configured as an integrated control unit that combines some or all of those units.

It will be clear to one skilled in the art that the embodiments described above can employ techniques that can be applied throughout the embodiments, including the variations thereon.

For example, the droplet counter unit 42 provided in the EUV light generation apparatus 1 according to the first embodiment may be applied in the EUV light generation apparatus 1 according to the third embodiment. In this case, the droplet output calculation process executed by the droplet output calculation control unit 43 according to the third embodiment can employ the droplet output calculation process according to the first embodiment (FIG. 7).

Although the droplet formation mechanism 73 according to the first to third embodiments employs the continuous jet technique, the droplet formation mechanism. 73 in the first to third embodiments may employ the electrostatic extraction technique used in the variation on the first embodiment.

The pressure adjustment mechanism 72 according to the third embodiment may be applied in the EUV light generation apparatus 1 according to the first and second embodiments. Because the initial amount V0 of the target 27 is found based on an actual measurement, the remaining amount Vres of the target 27 held in the tank 261 can be calculated with a higher level of accuracy.

The EUV light generation apparatus 1 according to the first to third embodiments is not limited to measuring the remaining amount Vres using the droplet image measurement unit 41, and may measure the remaining amount Vres using the liquid surface level sensor 8 as well.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. An extreme ultraviolet light generation apparatus, comprising:

a chamber into which droplets are sequentially outputted, the chamber including an image capturing unit configured to repeatedly capture images of the droplets during an image capturing time set so that images of two adjacent droplets that have been outputted do not overlap, a target generation apparatus configured to hold a target that generates extreme ultraviolet light when irradiated with a laser beam within the chamber and configured to output the target into the chamber as the droplets;

a droplet image measurement unit configured to measure image data captured by the image capturing unit of the droplets outputted into the chamber;

a droplet diameter calculation unit configured to calculate a diameter of the droplets based on the image data, a droplet output calculation control unit configured to calculate a total output amount of the droplets outputted into the chamber based on the diameter;

a remaining target amount calculation unit configured to calculate a remaining amount of the target held in the target generation apparatus based on an initial amount of the target held in the target generation apparatus before outputting the droplets into the chamber and the total output amount; and a droplet counter unit configured to count the number of the droplets outputted into the chamber, wherein when a distance between the images of the two droplets in a travel direction of the droplets is represented by d and a travel velocity of the droplets is represented by v, a single image capturing time $\Delta t$ of the image capturing unit is expressed by $\Delta t<d/v$, wherein when a length of an image capturing range of the image capturing unit in the travel direction of the droplets is represented by A, the single image capturing time $\Delta t$ of the image capturing unit is set so that a relationship $\Delta t>(d-A)/v$ is fulfilled, and wherein the droplet output calculation control unit is configured to calculate the total output amount based on the number and diameter of the droplets.

2. The extreme ultraviolet light generation apparatus according to claim 1, wherein the target generation apparatus includes:

a tank configured to hold the target;

a pressure adjustment mechanism configured to supply a gas to the tank and adjust a pressure within the tank; and an initial target amount calculation unit configured to calculate the initial amount based on a pressure within the tank that holds the target after the gas has been supplied to the tank.

* * * * *